(12) United States Patent
Daly et al.

(10) Patent No.: US 12,483,516 B2
(45) Date of Patent: Nov. 25, 2025

(54) TRANSPORT AND CRYPTOGRAPHY OFFLOAD TO A NETWORK INTERFACE DEVICE

(71) Applicant: Intel Corporation, Santa Clara, CA (US)

(72) Inventors: Daniel Daly, Santa Barbara, CA (US); Anjali Singhai Jain, Portland, OR (US); Yadong Li, Portland, OR (US); Stephen Doyle, Ennis (IE); Naru Dames Sundar, Los Gatos, CA (US); Chih-Jen Chang, Union City, CA (US); Sailesh Bissessur, Phoenix, AZ (US); Andrew Cunningham, Ennis (IE); Edwin Verplanke, Chandler, AZ (US); Patrick Fleming, Slatt Wolfhill (IE)

(73) Assignee: Intel Corporation, Santa Clara, CA (US)

( * ) Notice: Subject to any disclaimer, the term of this patent is extended or adjusted under 35 U.S.C. 154(b) by 528 days.

(21) Appl. No.: 17/544,699

(22) Filed: Dec. 7, 2021

(65) Prior Publication Data
US 2022/0103530 A1    Mar. 31, 2022

Related U.S. Application Data

(60) Provisional application No. 63/145,327, filed on Feb. 3, 2021, provisional application No. 63/122,896, filed on Dec. 8, 2020.

(51) Int. Cl.
*H04L 9/40* (2022.01)
*H04L 47/2425* (2022.01)
(Continued)

(52) U.S. Cl.
CPC ........ *H04L 47/762* (2013.01); *H04L 47/2425* (2013.01); *H04L 47/781* (2013.01);
(Continued)

(58) Field of Classification Search
CPC . H04L 47/762; H04L 47/2425; H04L 47/781; H04L 47/803; H04L 63/0428;
(Continued)

(56) References Cited

U.S. PATENT DOCUMENTS

| 8,839,370 B2 | 9/2014 | Singh et al. |
| 10,552,274 B1 | 2/2020 | Zhao et al. |

(Continued)

FOREIGN PATENT DOCUMENTS

| CN | 105765568 A | 7/2016 |
| CN | 110896373 A | 3/2020 |

(Continued)

OTHER PUBLICATIONS

Karlsson et al. "The path to DPDK speeds for AF XDP" Linux Plumbers Conference, 2018—personeltest.ru (Year: 2018).*

(Continued)

*Primary Examiner* — Farid Homayounmehr
*Assistant Examiner* — Mudasiru K Olaegbe
(74) *Attorney, Agent, or Firm* — Compass IP Law PC

(57) ABSTRACT

Examples described herein relate to a network interface device that includes circuitry, configured to perform encryption of data, generate one or more packets from the encrypted data, cause transmission of the one or more packets with the encrypted data, manage reliability of transport of the transmitted one or more packets with the encrypted data, and share protocol state information between a host system and the network interface device using connectivity based on user space accessible queues.

18 Claims, 17 Drawing Sheets

(51) Int. Cl.
  *H04L 47/762* (2022.01)
  *H04L 47/78* (2022.01)
  *H04L 47/80* (2022.01)
(52) U.S. Cl.
  CPC ........ *H04L 47/803* (2013.01); *H04L 63/0428* (2013.01); *H04L 63/101* (2013.01); *H04L 63/166* (2013.01)
(58) Field of Classification Search
  CPC ..... H04L 63/101; H04L 63/166; H04L 47/83; G06F 21/53
  See application file for complete search history.

(56) References Cited

U.S. PATENT DOCUMENTS

| | | | | |
|---|---|---|---|---|
| 11,336,627 | B2* | 5/2022 | Manasse | H04L 63/0281 |
| 11,841,985 | B2* | 12/2023 | Schiattarella | G06F 21/85 |
| 2010/0232429 | A1* | 9/2010 | Rao | H04L 41/0894 370/389 |
| 2011/0299409 | A1 | 12/2011 | Vobbilisetty et al. | |
| 2014/0280737 | A1* | 9/2014 | Bicket | H04L 67/02 709/218 |
| 2015/0067819 | A1* | 3/2015 | Shribman | H04L 67/141 709/218 |
| 2015/0180736 | A1 | 6/2015 | Leung | |
| 2018/0181763 | A1* | 6/2018 | Gunda | G06F 21/50 |
| 2018/0295045 | A1 | 10/2018 | Bali et al. | |
| 2019/0044812 | A1 | 2/2019 | Loftus et al. | |
| 2019/0044994 | A1 | 2/2019 | Sarangam et al. | |
| 2019/0119835 | A1 | 4/2019 | Yenici et al. | |
| 2019/0190891 | A1 | 6/2019 | Pillai et al. | |
| 2019/0306282 | A1* | 10/2019 | Masputra | H04L 69/321 |
| 2020/0053064 | A1 | 2/2020 | Oprisan et al. | |
| 2020/0099628 | A1 | 3/2020 | Parikh et al. | |
| 2020/0133795 | A1 | 4/2020 | Rhodes et al. | |
| 2020/0236140 | A1 | 7/2020 | Srinivasan et al. | |
| 2020/0249874 | A1 | 8/2020 | Foo | |
| 2020/0287813 | A1 | 9/2020 | Kutch et al. | |
| 2020/0319812 | A1* | 10/2020 | He | G06F 3/0665 |
| 2020/0403919 | A1 | 12/2020 | Cui et al. | |
| 2021/0103403 | A1* | 4/2021 | He | G06F 3/0655 |
| 2021/0117242 | A1 | 4/2021 | Groenendaal et al. | |
| 2021/0194828 | A1* | 6/2021 | He | H04L 47/13 |
| 2021/0243247 | A1 | 8/2021 | He et al. | |
| 2021/0266253 | A1 | 8/2021 | He et al. | |
| 2021/0352044 | A1 | 11/2021 | Asveren et al. | |
| 2022/0029929 | A1 | 1/2022 | Jain et al. | |

FOREIGN PATENT DOCUMENTS

| | | |
|---|---|---|
| CN | 112513988 A | 3/2021 |
| WO | 2020030311 A1 | 2/2020 |
| WO | 2020041569 A1 | 2/2020 |

OTHER PUBLICATIONS

"HTTP and gRPC Transcoding", AIP-127, https://google.aip.dev/127, Last updated Aug. 22, 2019, 3 pages.
"Improving Network Monitoring and Management with Programmable Data Planes", ONF, https://opennetworking.org/news-and-events/blog/improving-network-monitoring-and-management-with-programmable-data-planes/, Sep. 25, 2015, 5 pages.
"Intel® Ethernet Adaptive Virtual Function (AVF) Hardware Architecture Specification (HAS)", Intel Networking Division, Revision: 1.0, Feb. 2018, 90 pages.
"Introduction to Intel Ethernet Flow Director and Memcached Performance", Intel White Paper, Oct. 13, 2014, 6 pages.
"OpenStack Networking Guide", openstack, https://docs.openstack.org/mitaka/networking-guide/, updated Aug. 16, 2019, 3 pages.
"P4-16 Language Specification", version 1.2.1, The P4 Language Consortium, Jun. 11, 2020, 113 pages.
"Trellis", Overview, Trellis is an open-source multi-purpose L2/L3 leaf-spine switching fabric., https://docs.trellisfabric.org/1.12/index.html, © Copyright 2019, Open Networking Foundation, 4 pages.
Xing, Li, et al., "Hyperscale rte_flow toward production is really happening", DPDK https://dpdkbordeaux2019.sched.com/event/RmZG, Sep. 20, 2019, 25 pages.
Zhang, Jiao, et al., "Fast Switch-Based Load Balancer Considering Application Server States", IEEE, https://eeexplore.ieee.org/document/9061132.
International Search Report and Written Opinion for PCT Patent Application No. PCT/US22/21795, Mailed Jun. 24, 2022, 12 pages.
First Office Action for U.S. Appl. No. 17/981,255, Mailed May 24, 2023, 7 pages.
Marcelo Abranches et al., 'A Userspace Transport Stack Doesn't Have to Mean Losing Linux Processing', 2020 IEEE Conference on Network Function Virtualization and Softwme Defined Networks (NFV-SDN), Dec. 24, 2020.
"Networking architecture", Security Guide Docmentation, https://docs.openstack.org/security-guide/networking/architecture.html, Jul. 27, 2021, 6 pages.
"Transcoding HTTP/JSON to gRPC", Google Cloud Endpoints, cloud.google.com/endpoints/docs/grpc/transcoding, downloaded from the internet Jul. 28, 2021, 14 pages.
Bosshart, Pat, et. al., "P4: Programming Protocol—Indpendent Packet Processors", ACM SIGCOMM, Computer Communication Review, vol. 44, No. 3, Jul. 2014, 8 pages.
Colyer, Adrian, "Snap: a microkernel approach to host networking", the morning paper, https://blog.acolyer.org/2019/11/11/snap-networking, Nov. 11, 2019, 8 pages.
Crilly, Liam, "Introducing a Technoloy Preview of NGINX Support for QUIC and HTTP/3", https://www.nginx.com/blog/introducing-technology-preview-nginx-support-for-quic-http-3/, Jun. 10, 2020, 10 pages.
Diptanu Gon Choudhury, 'XDP-Programmable Data Path in the Linux Kernel', ;login: Spring 2018, vol. 43, No. 1, pp. 26-30, 2018, 6 pages.
Intel, "Intel Ethernet Adaptive Virtual Function (AVF) Hardware Architecture Specification (HAS)", Networking Division, Revision: 1.0, Feb. 2018, 90 pages.
Intel, "Introduction to Intel® Ethernet Flow Director and Memcached Performance", White Paper, Intel® Ethernet Flow Director and Memcached Performance, Copyright © 2014 Intel Corporation, 6 pages.
International Search Report and Written Opinion for PCT Patent Application No. PCT/US21/65177, Mailed Apr. 25, 2022, 10 pages.
International Search Report and Written Opinion for PCT Patent Application No. PCT/US22/11045, Mailed Apr. 25, 2022, 11 pages.
Irfan, Talal, "AF_XDP101L Getting Started With an In-Kernel network stack Bypass", Published in Emumba, https://blog.emumba.com/af-xdp-101-getting-started-with-an-in-kernel-network-stack-bypass-6e6901a285c8, Jun. 24, 2020, 10 pages.
Iyengar, Ed, et. al., "QUIC: A UDP-Based Multiplexed and Secure Transport draft-ietf-quic-transport-29", https://datatracker.ietf.org/doc/html/draft-ietf-quic-transport-29#page-23, Jun. 10, 2020, 187 pages.
Karlsson Magnus, et. al., 'The path to DPDK speeds for AF XDP', Linux Plumbers Conference, 2018, 9 pages.
Karlsson, Magnus, "Performance I40E 64-Byte Packets", Fast Packet Processing in Linux with AF_XDP, FOSDEM 2018, 1 page.
Li Xing, Alibaba, et. al., "Hyperscale rte_flow toward productoin is really happening" DPDK Data Pane Development Kit, DPDK Summit Bordeaux 2019, 25 pages.
Marcelo Abranches, et. al., 'A Userspace Transport Stack Doesn't Have to Mean Losing Linux Processing', 2020 IEEE Conference on Nettwork Function Virtualization and Software Defined Networks (NFV-SDN), Dec. 24, 2020, 7 pages.
MVS, Janakiram, "Service Mesh—The New Battleground for the Platfor Wars", Sep. 20, 2020, 8 pages.
Nguyen Van Tu, et. al., 'Accelerating Virtual Network Functions with Fast-Slow Path Architecture using express Data Path', IEEE Transactions on Network and Service Management vol. 17. Issue 3, Jun. 5, 2020, 13 pages.

(56) References Cited

OTHER PUBLICATIONS

P4.org, "Improving Network Monitoring and Management with Progammable Data Planes", ONF, https://opennetworking.org/news-and-events/blog/improving-network-monitoring-and-management-with-programmable-data-planes/, Sep. 25, 2015, 7 pages.

P4.org, "In-band Network Telemetry (INT) Dataplane Specification", Version 2.1, The P4.org Applications Working Group. Contributions from Alibaba, Arista, CableLabs, Cisco Systems, Dell, Intel, Marvell, Netronome, VMware, Nov. 11, 2020, 56 pages.

Peterson, Larry, "Trellis", Dashboard / CORD—Wiki Home / Project and Domains of Use, https://wiki.opecord.brg/display/CORD/Trellis, Jul. 27, 2021, 3 pages.

Postel, J., "User Datagram Protocol", RFC 768, Aug. 28, 1980, 3 pages.

Wiggins, Adam, "The Twelve-Factor App", VII. Port binding, https://12factor.net/port-binding, Last updated 2017, 1 page.

Ian Pratt and Keir Fraser, Arsenic: A User-Accessible Gigabit Ethernet Interface, year 2001, IEEE, 0-7803-7016-3/01, pp. 67-76 (Year: 2001).

International Search Report and Written Opinion for PCT Patent Application No. PCT/US21/57130, Mailed Feb. 21, 2022, 10 pages.

Non-Published commonly owned U.S. Appl. No. 17/238,893, filed Apr. 23, 2021, 87 pages, Intel Corporation.

Notice of Allowance for U.S. Appl. No. 17/238,893, Mailed Feb. 9, 2022, 10 pages.

First Office Action for U.S. Appl. No. 17/492,420, Mailed Feb. 1, 2024, 15 pages.

Corbet Jonathan: "Accelerating networking with AF_XDP [LWN.net]", Apr. 9, 2018 (Apr. 9, 2018), XP093235179, LWN Net Retrieved from the Internet: URL:https://lwn.net/Articles/750845/ [retrieved on Dec. 17, 2024] * the whole document *, 5 pages.

Extended European Search Report for Patent Application No. 22750139.2, Mailed Jan. 9, 2025, 13 pages.

Hu Xiaokang et al: "QTLS high-performance TLS asynchronous offload framework with Intel QuickAssist technology", Proceedings of the 17th ACM Conference on International Computing Education Research, ACM PUB27, New York, NY, USA, Feb. 16, 2019 (Feb. 16, 2019), pp. 158-172, 15 pages.

Taiwanese and English Translation of Taiwan IPO Search Report for Patent Application No. 110140627, Mailed Dec. 2, 2024, 2 pages.

Extended European Search Report for Patent Application No. 21925082.6, Mailed Nov. 25, 2024, 14 pages.

\* cited by examiner though data center 100 is shown with multiple systems, in

TRANSPORT AND CRYPTOGRAPHY OFFLOAD TO A NETWORK INTERFACE DEVICE

RELATED APPLICATION

The present application claims the benefit of a priority date of U.S. provisional patent application Ser. No. 63/122,896, filed Dec. 8, 2020 and U.S. provisional patent application Ser. No. 63/145,327, filed Feb. 3, 2021. The entire disclosures of those provisional applications are incorporated herein by reference.

BACKGROUND

In a data center with high levels of packet traffic, central processing unit (CPU) resources of servers can be used to perform packet processing at least in connection with reliable transport of data between nodes; encryption/decryption the data; or enforcement of network policy, load balancing and routing of data through the network. However, such CPU resources could have otherwise been used to run workloads other than network-related computation.

DETAILED DESCRIPTION

A network interface device can perform offloaded kernel Transport Layer Security (TLS) (kTLS) or TLS encryption and decryption as well as manage reliable transport from a host server system to a network interface device. In some examples, the network interface device can update an operating system (OS) executing on the host server system with state information related at least to kTLS, TLS, and reliable transport. State information can include meta data related at least to reliable transport, congestion management and security association.

Figure 1:
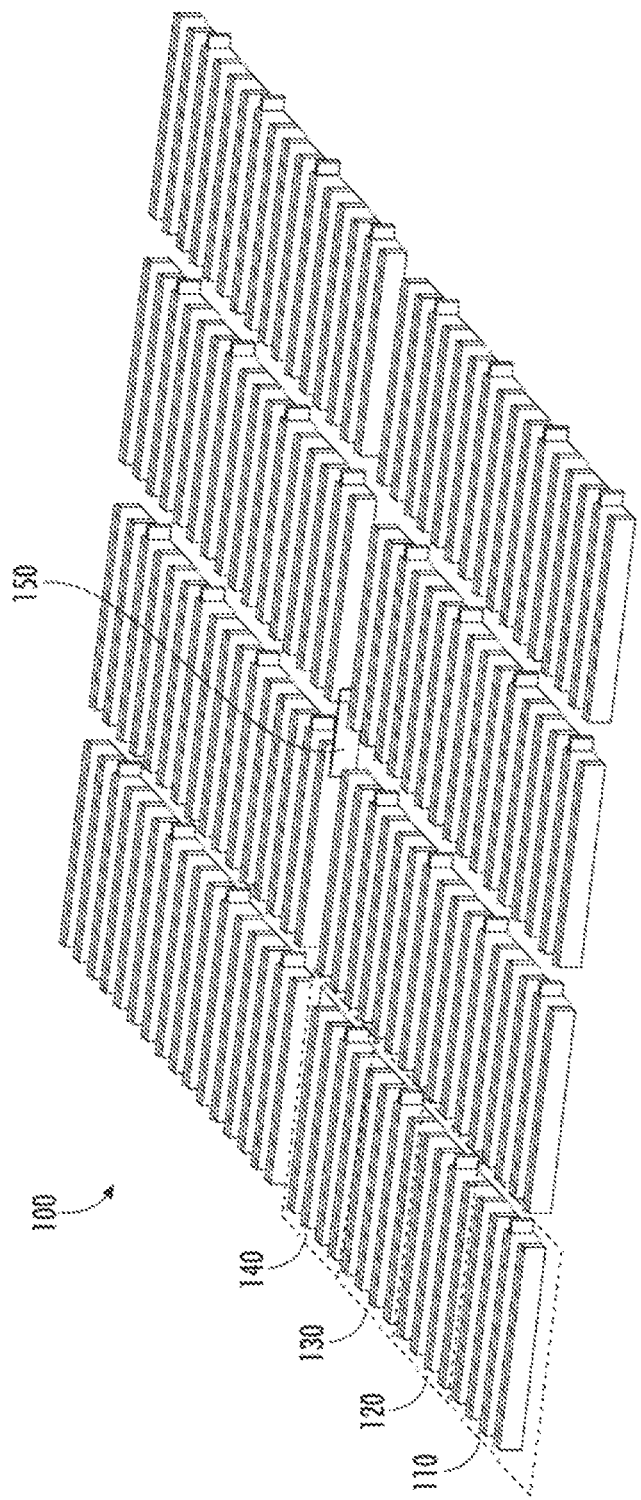
FIG. 1 is a simplified diagram of at least one example of a data center for executing workloads with disaggregated resources.

FIG. 1 depicts a data center in which disaggregated resources may cooperatively execute one or more workloads (e.g., applications on behalf of customers) that includes multiple systems 110, 120, 130, 140, a system being or including one or more rows of racks or trays. Of course, although data center 100 is shown with multiple systems, in some examples, the data center 100 may be embodied as a single system. As described in more detail herein, a rack houses multiple nodes, some of which may be equipped with one or more types of resources (e.g., memory devices, data storage devices, accelerator devices, general purpose processors, GPUs, xPUs, CPUs, field programmable gate arrays (FPGAs), or application-specific integrated circuits (ASICs)). Resources can be logically coupled or aggregated to form a composed node, which can act as, for example, a server to perform a job, workload or microservices.

Various examples described herein can perform an application composed of microservices, where a microservice runs in its own process and communicates using protocols (e.g., application program interface (API), a Hypertext Transfer Protocol (HTTP) resource API, message service, remote procedure calls (RPC), or Google RPC (gRPC)). Microservices can communicate with one another using a service mesh and be executed in one or more data centers or edge networks. Microservices can be independently deployed using centralized management of these services. The management system may be written in different programming languages and use different data storage technologies. A microservice can be characterized by one or more of: polyglot programming (e.g., code written in multiple languages to capture additional functionality and efficiency not available in a single language), or container or virtual machine deployment, and decentralized continuous microservice delivery. One or more microservices can execute on or using any resources described herein, such as resources of FIGS. 3-9.

Various examples can include a virtualized execution environment (VEE) that is executed by and utilizes resources described with respect to FIGS. 3-9. A VEE can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can include an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from another, allowing virtual machines to run Linux®, Windows® Server, VMware ESXi, and other operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers may be isolated from the other software and the operating system itself. The isolated nature of containers provides several benefits. First, the software in a container will run the same in different environments. For example, a container that includes PHP and MySQL can run identically on both a Linux® computer and a Windows® machine. Second, containers provide added security since the software will not affect the host operating system. While an installed application may alter system settings and modify resources, such as the Windows registry, a container can only modify settings within the container.

Various examples can include a serverless application or function (e.g., Function as a Service (FaaS)) that can be executed by or utilize available resources described with respect to FIGS. 1-9 as well as computing resources at a data center, edge computing device, or fog network device or in disaggregated computing and memory resources. For example, for a serverless application, a cloud service provider dynamically manages allocation and provisioning of servers and a serverless application runs in stateless compute containers that are event-triggered and may last for one invocation. A serverless application can be event-driven, cloud-based application where application development relies on a combination of third-party services, client-side logic and cloud-hosted remote procedure calls. Serverless application can be pay-per-use computing or bare-code where users are charged based on time and computing resources (e.g., CPU, networking, or memory) allocated to run serverless application without associated fees for idle time of computing resources. In some examples, a serverless application or function can be performed by a network infrastructure device or network interface device (e.g., a network interface controller (NIC), a remote direct memory access (RDMA)-enabled NIC, SmartNIC, router, switch, forwarding element, infrastructure processing unit (IPU), data processing unit (DPU), or network-attached appliance (e.g., storage, memory, accelerator, processors, security) or accelerator, in addition or alternative to use of a server or general purpose computing platform.

Note that reference to virtualized execution environment, application, microservice, or serverless application can be used interchangeably so that reference to virtualized execution environment can refer to microservice, application, and/or serverless application, reference to microservice can refer to virtualized execution environment, application, and/or serverless application, and so forth.

In the illustrative example, the nodes in systems 110, 120, 130, 140 are connected to multiple system switches (e.g., switches that route data communications to and from nodes within the system). Switches can be positioned at the top of rack (TOR), end of row (EOR), middle of rack (MOR), or other. The system switches, in turn, connect with spine switches 150 that switch communications among systems (e.g., the systems 110, 120, 130, 140) in the data center 100. In some examples, the nodes may be connected with a fabric using standards described herein or proprietary standards. In other examples, the nodes may be connected with other fabrics, such as InfiniBand or Ethernet or optical. As described in more detail herein, resources within nodes in the data center 100 may be allocated to a group (referred to herein as a "managed node") containing resources from one or more nodes to be collectively utilized in the execution of a workload. The workload can execute as if the resources belonging to the managed node were located on the same node. The resources in a managed node may belong to nodes belonging to different racks, and even to different systems 110, 120, 130, 140. As such, some resources of a single node may be allocated to one managed node while other resources of the same node are allocated to a different managed node (e.g., one processor assigned to one managed node and another processor of the same node assigned to a different managed node).

The disaggregation of resources to nodes comprised predominantly of a single type of resource (e.g., compute nodes comprising primarily compute resources, memory nodes containing primarily memory resources), and the selective allocation and deallocation of the disaggregated resources to form a managed node assigned to execute a workload can allow the operation and resource usage of the data center 100 relative to typical data centers comprised of hyperconverged servers containing compute, memory, storage and perhaps additional resources. For example, because nodes predominantly contain resources of a particular type, resources of a given type can be upgraded independently of other resources. Additionally, because different resource types (processors, memory, storage, accelerators, etc.) typically have different refresh rates, greater resource utilization, and reduced total cost of ownership may be achieved. For example, a data center operator can upgrade the processors throughout their facility by only swapping out the compute nodes. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
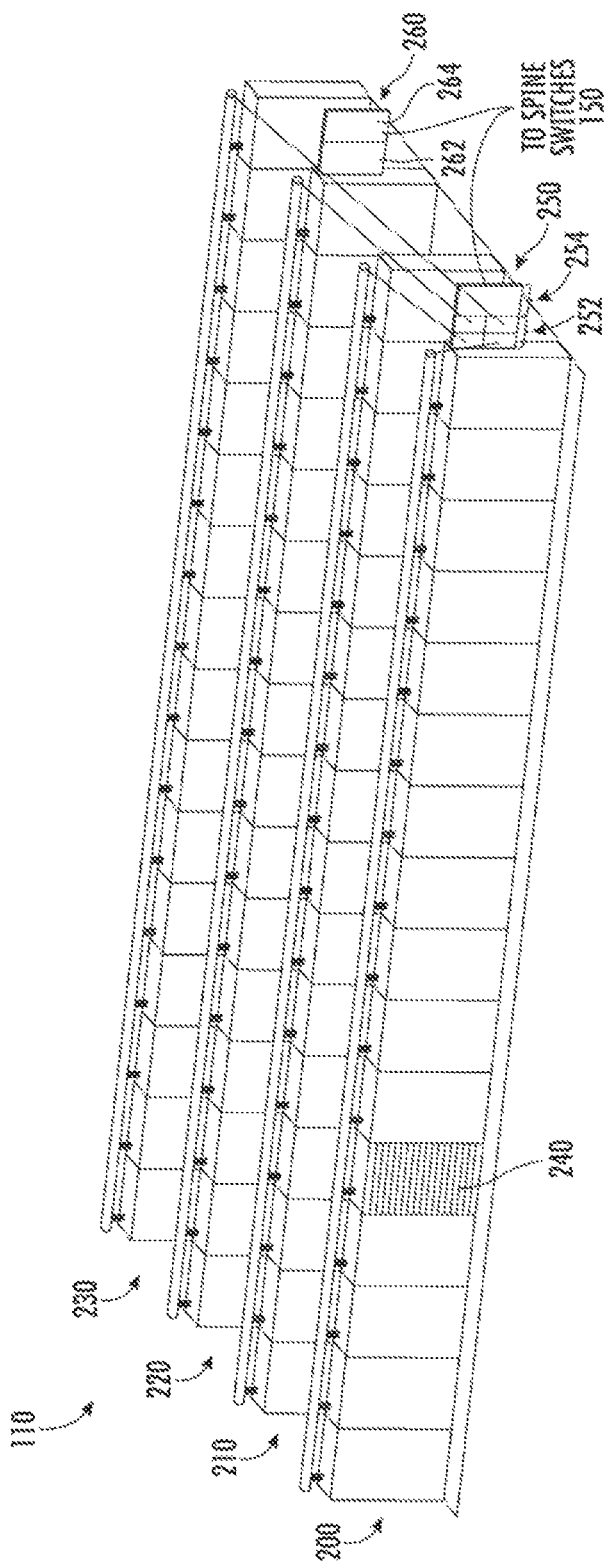
FIG. 2 is a simplified diagram of at least one example of a system that may be included in a data center.

FIG. 2 depicts a system. A system can include a set of rows 200, 210, 220, 230 of racks 240. Rack 240 may house multiple nodes (e.g., sixteen nodes) and provide power and data connections to the housed nodes, as described in more detail herein. In the illustrative example, the racks in rows 200, 210, 220, 230 are connected to multiple system switches 250, 260. The system switch 250 includes a set of ports 252 to which the nodes of the racks of the system 110 are connected and another set of ports 254 that connect the system 110 to the spine switches 150 to provide connectivity to other systems in the data center 100. Similarly, the system switch 260 includes a set of ports 262 to which the nodes of the racks of the system 110 are connected and a set of ports 264 that connect the system 110 to the spine switches 150. As such, the use of the pair of switches 250, 260 provides an amount of redundancy to the system 110. For example, if either of the switches 250, 260 fails, the nodes in the system 110 may still maintain data communication with the remainder of the data center 100 (e.g., nodes of other systems) through the other switch 250, 260. Furthermore, in the illustrative example, the switches 150, 250, 260 may be embodied as dual-mode optical switches, capable of routing both Ethernet protocol communications carrying Internet Protocol (IP) packets and communications according to a second, high-performance link-layer protocol (e.g., PCI Express or Compute Express Link) via optical signaling media of an optical fabric.

It should be appreciated that the other systems 120, 130, 140 (as well as additional systems of the data center 100) may be similarly structured as, and have components similar to, the system 110 shown in and described in regard to FIG. 2 (e.g., a system may have rows of racks housing multiple nodes as described above). Additionally, while two system switches 250, 260 are shown, it should be understood that in other examples, systems 110, 120, 130, 140 may be connected to a different number of system switches, providing even more failover capacity. Of course, in other examples, systems may be arranged differently than the rows-of-racks configuration shown in FIGS. 1-2. For example, a system may be embodied as multiple sets of racks in which a set of racks is arranged radially, e.g., the racks are equidistant from a center switch.

Figure 3:
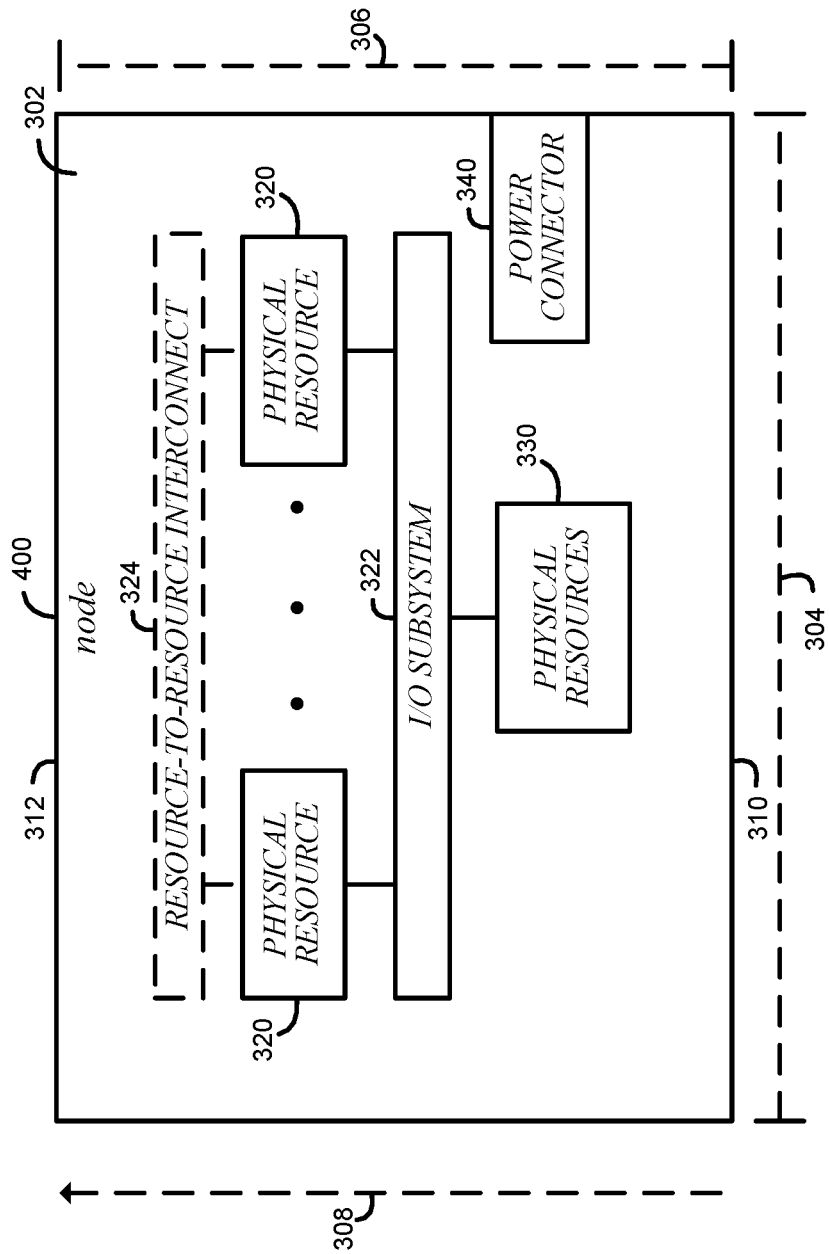
FIG. 3 is a simplified block diagram of at least one example of a top side of a node.

Referring now to FIG. 3, node 400, in the illustrative example, is configured to be mounted in a corresponding rack 240 of the data center 100 as discussed above. In some examples, node 400 may be optimized or otherwise configured for performing particular tasks, such as compute tasks, acceleration tasks, data storage tasks, etc. For example, the node 400 may be embodied as a compute node 500 as discussed below in regard to FIG. 5, an accelerator node 600 as discussed below in regard to FIG. 6, a storage node 700 as discussed below in regard to FIG. 7, or as a node optimized or otherwise configured to perform other specialized tasks, such as a memory node 800, discussed below in regard to FIG. 8. For example, one or more microservices can execute on or using node 400, node 500, accelerator node 600, storage node 700, and/or memory node 800. As described herein, a storage node 700 or memory node 800 can be selected to store data for access by node 400, node 500, or accelerator node 600 to reduce a transit time of data to meet applicable service level agreement (SLA) parameters.

Although two physical resources 320 are shown in FIG. 3, it should be appreciated that the node 400 may include one, two, or more physical resources 320 in other examples. The physical resources 320 may be embodied as any type of processor, controller, or other compute circuit capable of performing various tasks such as compute functions and/or controlling the functions of the node 400 depending on, for example, the type or intended functionality of the node 400. For example, as discussed in more detail below, the physical resources 320 may be embodied as high-performance processors in examples in which the node 400 is embodied as a compute node, as accelerator co-processors or circuits in examples in which the node 400 is embodied as an accelerator node, storage controllers in examples in which the node 400 is embodied as a storage node, or a set of memory devices in examples in which the node 400 is embodied as a memory node.

The node 400 also includes one or more additional physical resources 330 mounted to circuit board substrate 302. In the illustrative example, the additional physical resources include a network interface controller (NIC) as discussed in more detail below. Of course, depending on the type and functionality of the node 400, the physical resources 330 may include additional or other electrical components, circuits, and/or devices in other examples.

The physical resources 320 can be communicatively coupled to the physical resources 330 via an input/output (I/O) subsystem 322. The I/O subsystem 322 may be embodied as circuitry and/or components to facilitate input/output operations with the physical resources 320, the physical resources 330, and/or other components of the node 400. For example, the I/O subsystem 322 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative example for memory system, the I/O subsystem 322 is embodied as, or otherwise includes, a double data rate 4 (DDR4) data bus or a DDR5 data bus.

In some examples, the node 400 may also include a resource-to-resource interconnect 324. The resource-to-resource interconnect 324 may be embodied as any type of communication interconnect capable of facilitating resource-to-resource communications. In the illustrative example, the resource-to-resource interconnect 324 is embodied as a high-speed point-to-point interconnect (e.g., faster than the I/O subsystem 322). For example, the resource-to-resource interconnect 324 may be embodied as a QuickPath Interconnect (QPI), an UltraPath Interconnect (UPI), Peripheral Component Interconnect Express (PCIe), Compute Express Link (CXL), or other high-speed point-to-point interconnect utilized for resource-to-resource communications. See, for example, PCI Express Base Specification 1.0 (2002), as well as earlier versions, later versions, and variations thereof. See, for example, Compute Express Link Specification revision 2.0, version 0.7 (2019), as well as earlier versions, later versions, and variations thereof.

The node 400 also includes a power connector 340 configured to mate with a corresponding power connector of the rack 240 when the node 400 is mounted in the corresponding rack 240. The node 400 receives power from a power supply of the rack 240 via the power connector 340 to supply power to the various electrical components of the node 400. In some examples, the node 400 includes local power supply (e.g., an on-board power supply) to provide power to the electrical components of the node 400. In some examples, the node 400 does not include any local power supply (e.g., an on-board power supply) to provide power to the electrical components of the node 400. The exclusion of a local or on-board power supply facilitates the reduction in the overall footprint of the circuit board substrate 302, which may increase the thermal cooling characteristics of the various electrical components mounted on the circuit board substrate 302 as discussed above. In some examples, voltage regulators are placed on circuit board substrate 302 directly opposite of the processors 520 (see FIG. 5), and power is routed from the voltage regulators to the processors 520 by vias extending through the circuit board substrate 302. Such a configuration provides an increased thermal budget, additional current and/or voltage, and better voltage control relative to typical printed circuit boards in which processor power is delivered from a voltage regulator, in part, by printed circuit traces.

Figure 4:
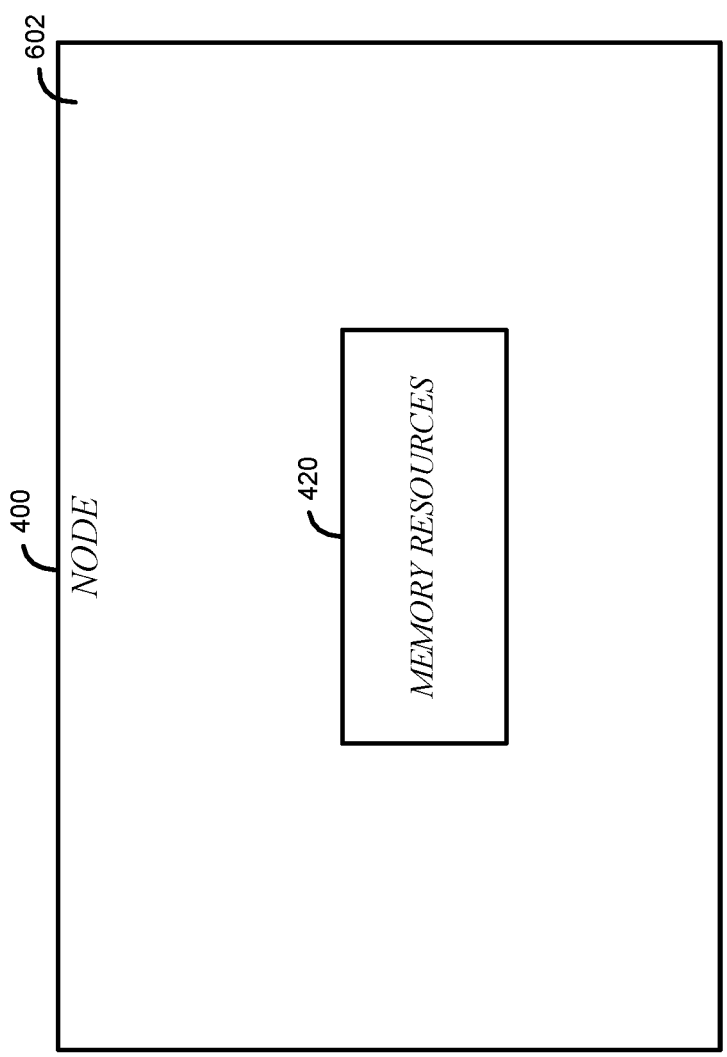
FIG. 4 is a simplified block diagram of at least one example of a bottom side of a node.

Referring now to FIG. 4, in addition to the physical resources 330 mounted on circuit board substrate 302, the node 400 also includes one or more memory devices 420. The physical resources 320 can be communicatively coupled to memory devices 420 via the I/O subsystem 322. For example, the physical resources 320 and the memory devices 420 may be communicatively coupled by one or more vias extending through the circuit board substrate 302. A physical resource 320 may be communicatively coupled to a different set of one or more memory devices 420 in some examples. Alternatively, in other examples, physical resource 320 may be communicatively coupled to memory device 420.

The memory devices 420 may be embodied as any type of memory device capable of storing data for the physical resources 320 during operation of the node 400, such as any type of volatile (e.g., dynamic random access memory (DRAM), etc.) or non-volatile memory.

In one example, the memory device is a block addressable memory device, such as those based on NAND or NOR technologies, for example, multi-threshold level NAND flash memory and NOR flash memory. A block can be any size such as but not limited to 2 KB, 4 KB, 5 KB, and so forth. A memory device may also include next-generation nonvolatile devices, such as Intel Optane® memory or other byte addressable write-in-place nonvolatile memory devices (e.g., memory devices that use chalcogenide glass), multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory. The memory device may refer to the die itself and/or to a packaged memory product. In some examples, the memory device may comprise a transistor-less stackable cross point architecture in which memory cells sit at the intersection of word lines and bit lines and are individually addressable and in which bit storage is based on a change in bulk resistance.

Figure 5:
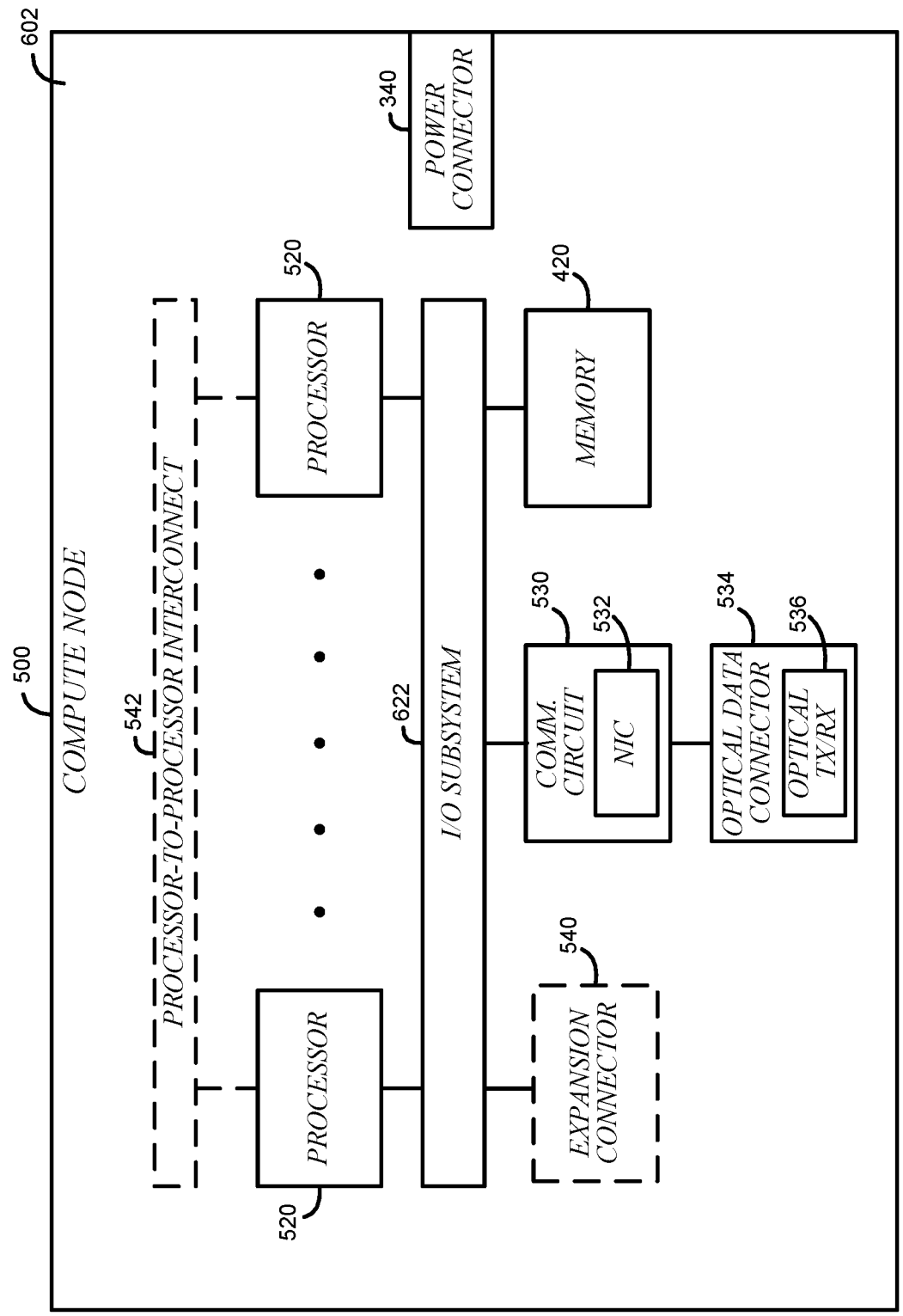
FIG. 5 is a simplified block diagram of at least one example of a compute node.

Referring now to FIG. 5, in some examples, the node 400 may be embodied as a compute node 500. The compute node 500 can be configured to perform compute tasks. Of course, as discussed above, the compute node 500 may rely on other nodes, such as acceleration nodes and/or storage nodes, to perform compute tasks. In the illustrative compute node 500, the physical resources 320 are embodied as processors 520. Although only two processors 520 are shown in FIG. 5, it should be appreciated that the compute node 500 may include additional processors 520 in other examples. Illustratively, the processors 520 are embodied as high-performance processors 520 and may be configured to operate at a relatively high power rating.

In some examples, the compute node 500 may also include a processor-to-processor interconnect 542. Processor-to-processor interconnect 542 may be embodied as any type of communication interconnect capable of facilitating processor-to-processor interconnect 542 communications. In the illustrative example, the processor-to-processor interconnect 542 is embodied as a high-speed point-to-point interconnect (e.g., faster than the I/O subsystem 322). For example, the processor-to-processor interconnect 542 may be embodied as a QuickPath Interconnect (QPI), an UltraPath Interconnect (UPI), or other high-speed point-to-point interconnect utilized for processor-to-processor communications (e.g., Peripheral Component Interconnect Express (PCIe) or CXL).

The compute node 500 also includes a communication circuit 530. The illustrative communication circuit 530 includes a network interface controller (NIC) 532, which may also be referred to as a host fabric interface (HFI). The NIC 532 may be embodied as, or otherwise include, any type of integrated circuit, discrete circuits, controller chips, chipsets, add-in-boards, daughtercards, network interface cards, or other devices that may be used by the compute node 500 to connect with another compute device (e.g., with other nodes 400). In some examples, the NIC 532 may be embodied as part of a system-on-a-chip (SoC) that includes one or more processors, or included on a multichip package that also contains one or more processors. In some examples, the NIC 532 may include a local processor (not shown) and/or a local memory (not shown) that are both local to the NIC 532. In such examples, the local processor of the NIC 532 may be capable of performing one or more of the functions of the processors 520. Additionally or alternatively, in such examples, the local memory of the NIC 532 may be integrated into one or more components of the compute node at the board level, socket level, chip level, and/or other levels. In some examples, a network interface includes a network interface controller or a network interface card. In some examples, a network interface can include one or more of a network interface controller (NIC) 532, a host fabric interface (HFI), a host bus adapter (HBA), network interface connected to a bus or connection (e.g., PCIe, CXL, DDR, and so forth). In some examples, a network interface can be part of a switch or a system-on-chip (SoC).

Some examples of a NIC 532 are part of an Infrastructure Processing Unit (IPU) or data processing unit (DPU) or utilized by an IPU or DPU. An IPU or DPU can include a network interface, memory devices, and one or more programmable or fixed function processors (e.g., CPU or XPU) to perform offload of operations that could have been performed by a host CPU or XPU or remote CPU or XPU. In some examples, the IPU or DPU can perform virtual switch operations, manage storage transactions (e.g., compression, cryptography, virtualization), and manage operations performed on other IPUs, DPUs, servers, or devices.

The communication circuit 530 is communicatively coupled to an optical data connector 534. The optical data connector 534 is configured to mate with a corresponding optical data connector of a rack when the compute node 500 is mounted in the rack. Illustratively, the optical data connector 534 includes a plurality of optical fibers which lead from a mating surface of the optical data connector 534 to an optical transceiver 536. The optical transceiver 536 is configured to convert incoming optical signals from the rack-side optical data connector to electrical signals and to convert electrical signals to outgoing optical signals to the rack-side optical data connector. Although shown as forming part of the optical data connector 534 in the illustrative example, the optical transceiver 536 may form a portion of the communication circuit 530 in other examples.

In some examples, the compute node 500 may also include an expansion connector 540. In such examples, the expansion connector 540 is configured to mate with a corresponding connector of an expansion circuit board substrate to provide additional physical resources to the compute node 500. The additional physical resources may be used, for example, by the processors 520 during operation of the compute node 500. The expansion circuit board substrate may be substantially similar to the circuit board substrate 302 discussed above and may include various electrical components mounted thereto. The particular electrical components mounted to the expansion circuit board substrate may depend on the intended functionality of the expansion circuit board substrate. For example, the expansion circuit board substrate may provide additional compute resources, memory resources, and/or storage resources. As such, the additional physical resources of the expansion circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits. Note that reference to GPU or CPU herein can in addition or alternatively refer to an XPU or xPU. An xPU can include one or more of: a GPU, ASIC, FPGA, or accelerator device.

Figure 6:
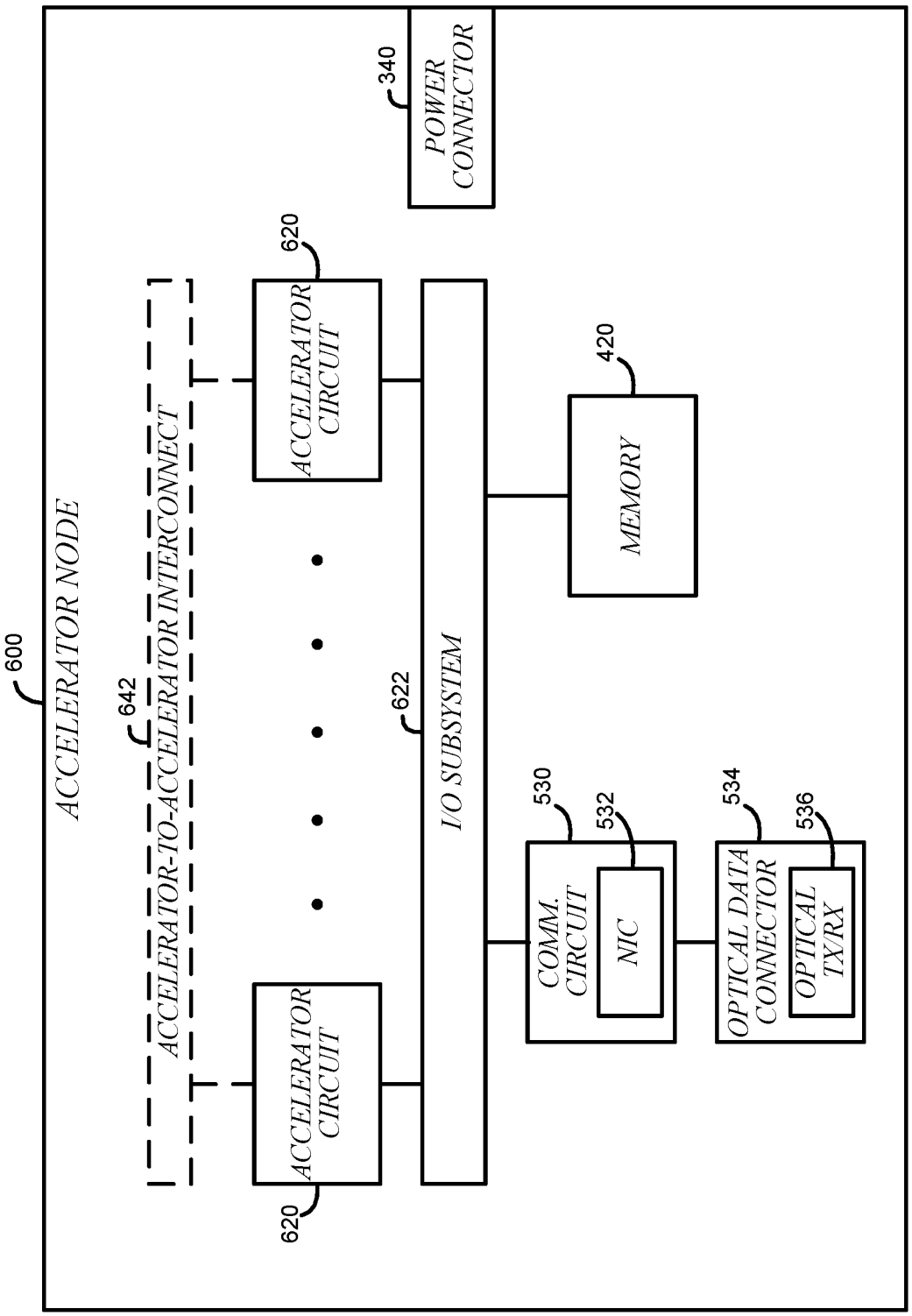
FIG. 6 is a simplified block diagram of at least one example of an accelerator node usable in a data center.

Referring now to FIG. 6, in some examples, the node 400 may be embodied as an accelerator node 600. The accelerator node 600 is configured to perform specialized compute tasks, such as machine learning, encryption, hashing, or other computational-intensive task. In some examples, for example, a compute node 500 may offload tasks to the accelerator node 600 during operation. The accelerator node 600 includes various components similar to components of the node 400 and/or compute node 500, which have been identified in FIG. 6 using the same reference numbers.

In the illustrative accelerator node 600, the physical resources 320 are embodied as accelerator circuits 620. Although only two accelerator circuits 620 are shown in FIG. 6, it should be appreciated that the accelerator node 600 may include additional accelerator circuits 620 in other examples. The accelerator circuits 620 may be embodied as any type of processor, co-processor, compute circuit, or other device capable of performing compute or processing operations. For example, the accelerator circuits 620 may be embodied as, for example, central processing units, cores, field programmable gate arrays (FPGA), application-specific integrated circuits (ASICs), programmable control logic (PCL), security co-processors, graphics processing units (GPUs), neuromorphic processor units, quantum computers, machine learning circuits, programmable processing pipeline (e.g., programmable by Programming Protocol-independent Packet Processors (P4), C, Python, Broadcom Network Programming Language (NPL), or x86 compatible executable binaries or other executable binaries). Processors, FPGAs, other specialized processors, controllers, devices, and/or circuits can be used utilized for packet processing or packet modification. Ternary content-addressable memory (TCAM) can be used for parallel match-action or look-up operations on packet header content.

In some examples, the accelerator node 600 may also include an accelerator-to-accelerator interconnect 642. Similar to the resource-to-resource interconnect 324 of the node 300 discussed above, the accelerator-to-accelerator interconnect 642 may be embodied as any type of communication interconnect capable of facilitating accelerator-to-accelerator communications. In the illustrative example, the accelerator-to-accelerator interconnect 642 is embodied as a high-speed point-to-point interconnect (e.g., faster than the I/O subsystem 322). For example, the accelerator-to-accelerator interconnect 642 may be embodied as a QuickPath Interconnect (QPI), an UltraPath Interconnect (UPI), or other high-speed point-to-point interconnect utilized for accelerator-to-accelerator communications. In some examples, the accelerator circuits 620 may be daisy-chained with a primary accelerator circuit 620 connected to the NIC 532 and memory 420 through the I/O subsystem 322 and a secondary accelerator circuit 620 connected to the NIC 532 and memory 420 through a primary accelerator circuit 620.

Figure 7:
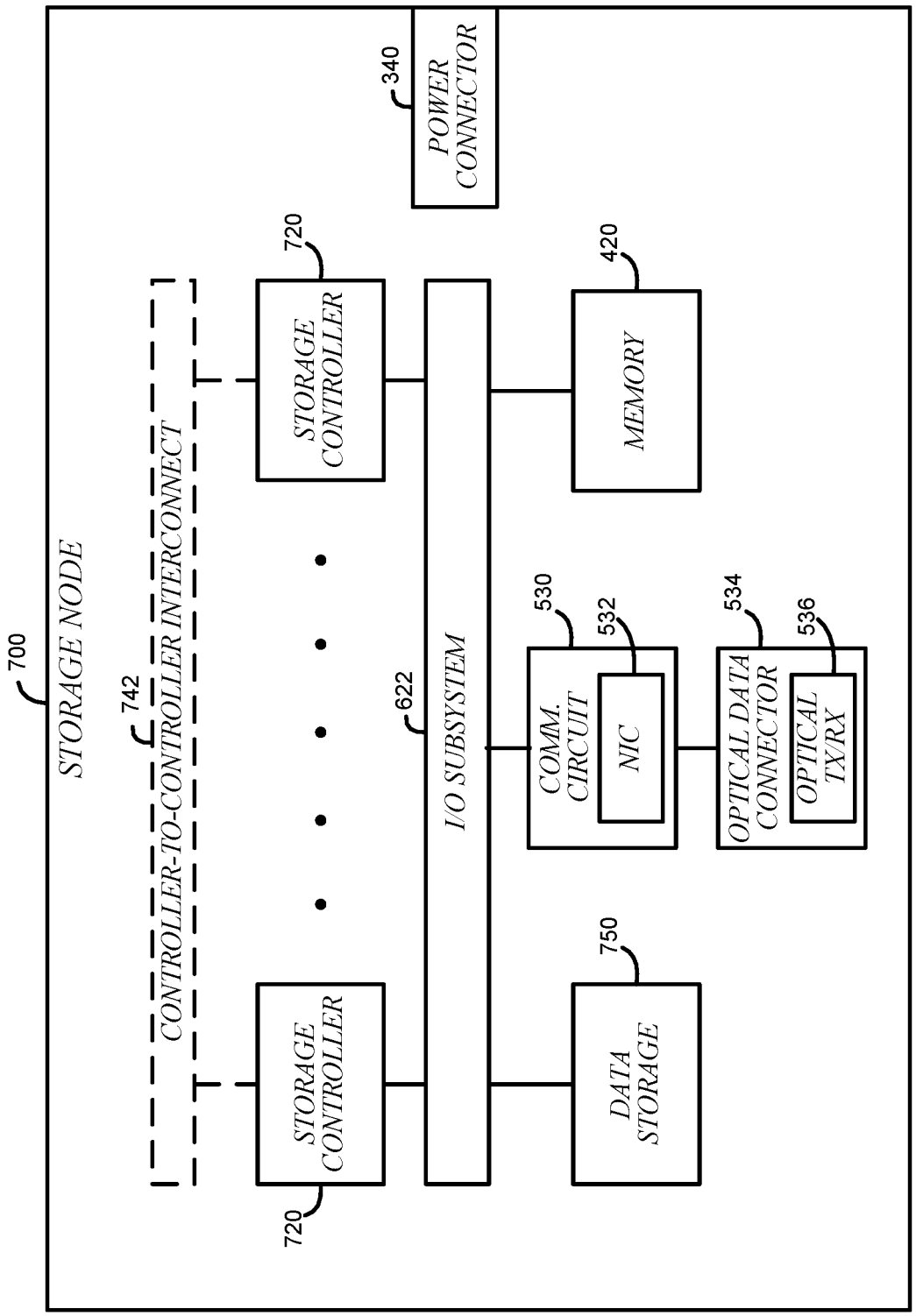
FIG. 7 is a simplified block diagram of at least one example of a storage node usable in a data center.

Referring now to FIG. 7, in some examples, the node 400 may be embodied as a storage node 700. The storage node 700 is configured in some examples to store data in a data storage 750 local to the storage node 700. For example, during operation, a compute node 500 or an accelerator node 600 may store and retrieve data from the data storage 750 of the storage node 700. The storage node 700 includes various components similar to components of the node 400 and/or the compute node 500, which have been identified in FIG. 7 using the same reference numbers.

In the illustrative storage node 700, the physical resources 320 are embodied as storage controllers 720. Although only two storage controllers 720 are shown in FIG. 7, it should be appreciated that the storage node 700 may include additional storage controllers 720 in other examples. The storage controllers 720 may be embodied as any type of processor, controller, or control circuit capable of controlling the storage and retrieval of data into/from the data storage 750 based on requests received via the communication circuit 530 or other components. In the illustrative example, the storage controllers 720 are embodied as relatively low-power processors or controllers.

In some examples, the storage node 700 may also include a controller-to-controller interconnect 742. Similar to the resource-to-resource interconnect 324 of the node 400 discussed above, the controller-to-controller interconnect 742 may be embodied as any type of communication interconnect capable of facilitating controller-to-controller communications. In the illustrative example, the controller-to-controller interconnect 742 is embodied as a high-speed point-to-point interconnect (e.g., faster than the I/O subsystem 322). For example, the controller-to-controller interconnect 742 may be embodied as a QuickPath Interconnect (QPI), an UltraPath Interconnect (UPI), or other high-speed point-to-point interconnect utilized for controller-to-controller communications.

Figure 8:
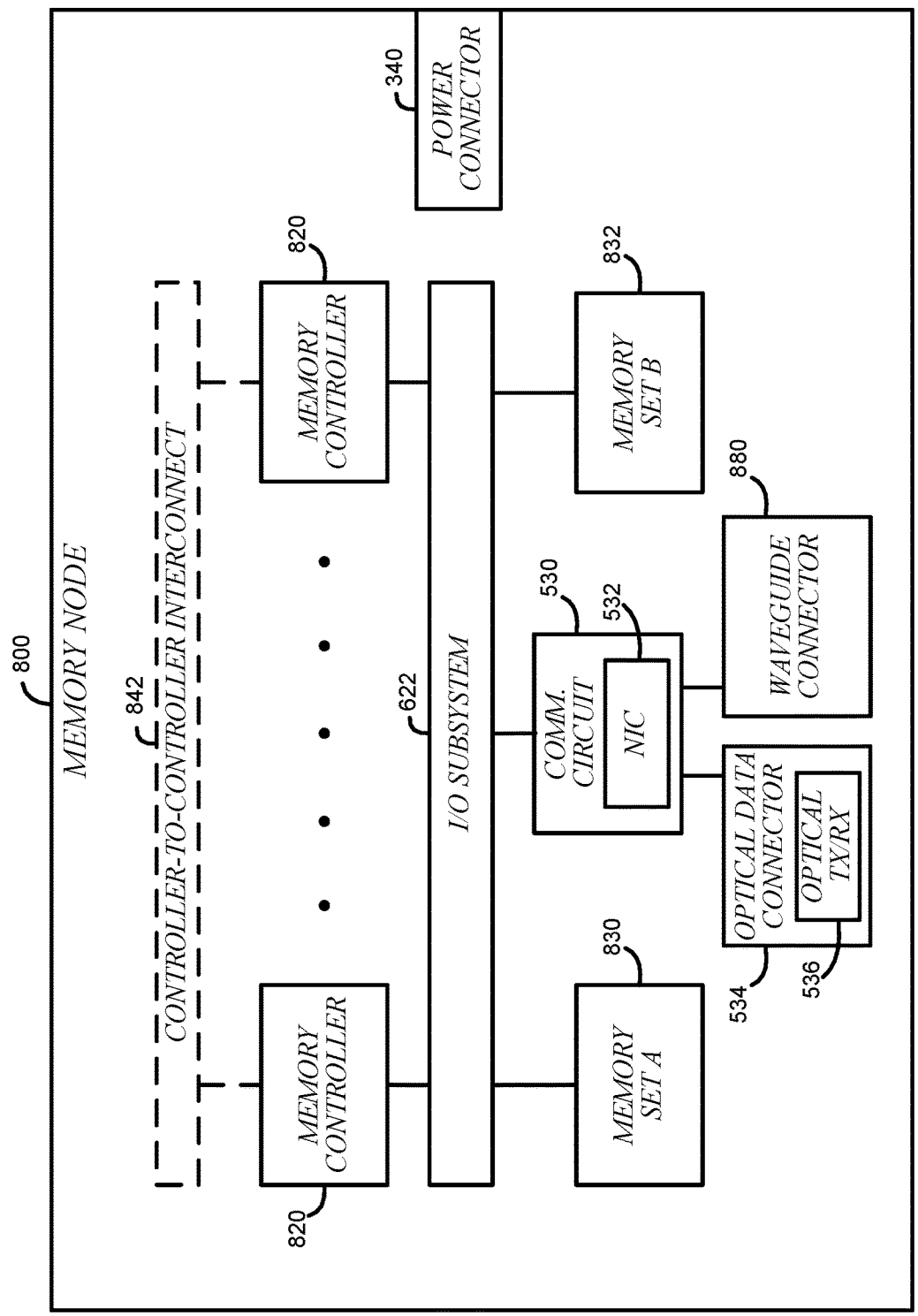
FIG. 8 is a simplified block diagram of at least one example of a memory node usable in a data center.

Referring now to FIG. 8, in some examples, the node 400 may be embodied as a memory node 800. The memory node 800 is configured to provide other nodes 400 (e.g., compute nodes 500, accelerator nodes 600, etc.) with access to a pool of memory (e.g., in two or more sets 830, 832 of memory devices 420) local to the storage node 700. Also, additional external memory sets can be facilitated using communication circuit 530 and memory sets on memory node(s) located in other physical nodes (not shown). For example, during operation, a compute node 500 or an accelerator node 600 may remotely write to and/or read from one or more of the memory sets 830, 832 of the memory node 800 using a logical address space that maps to physical addresses in the memory sets 830, 832.

In the illustrative memory node 800, the physical resources 320 are embodied as memory controllers 820. Although only two memory controllers 820 are shown in FIG. 8, it should be appreciated that the memory node 800 may include additional memory controllers 820 in other examples. The memory controllers 820 may be embodied as any type of processor, controller, or control circuit capable of controlling the writing and reading of data into the memory sets 830, 832 based on requests received via the communication circuit 530. In the illustrative example, memory controller 820 is connected to a corresponding memory set 830, 832 to write to and read from memory devices 420 within the corresponding memory set 830, 832 and enforce a permissions (e.g., read, write, etc.) associated with node 400 that has sent a request to the memory node 800 to perform a memory access operation (e.g., read or write).

In some examples, the memory node 800 may also include a controller-to-controller interconnect 842. Similar to the resource-to-resource interconnect 324 of the node 400 discussed above, the controller-to-controller interconnect 842 may be embodied as any type of communication interconnect capable of facilitating controller-to-controller communications. In the illustrative example, the controller-to-controller interconnect 842 is embodied as a high-speed point-to-point interconnect (e.g., faster than the I/O subsystem 322). For example, the controller-to-controller interconnect 842 may be embodied as a QuickPath Interconnect (QPI), an UltraPath Interconnect (UPI), or other high-speed point-to-point interconnect utilized for controller-to-controller communications. As such, in some examples, a memory controller 820 may access, through the controller-to-controller interconnect 842, memory that is within the memory set 832 associated with another memory controller 820. In some examples, a scalable memory controller is made of multiple smaller memory controllers, referred to herein as "chiplets", on a memory node (e.g., the memory node 800). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some examples, the memory controllers 820 may implement a memory interleave (e.g., one memory address is mapped to the memory set 830, the next memory address is mapped to the memory set 832, and the third address is mapped to the memory set 830, etc.). The interleaving may be managed within the memory controllers 820, or from CPU sockets (e.g., of the compute node 500) across network links to the memory sets 830, 832, and may reduce the latency and bandwidth associated with performing memory access operations as compared to accessing contiguous memory addresses from the same memory device.

Further, in some examples, the memory node 800 may be connected to one or more other nodes 400 (e.g., in the same rack 240 or an adjacent rack 240) through a waveguide, using the waveguide connector 880. Using a waveguide may provide high throughput access to the memory pool (e.g., the memory sets 830, 832) to another node (e.g., a node 400 in the same rack 240 or an adjacent rack 240 as the memory node 800) without adding to the load on the optical data connector 534.

Figure 9:
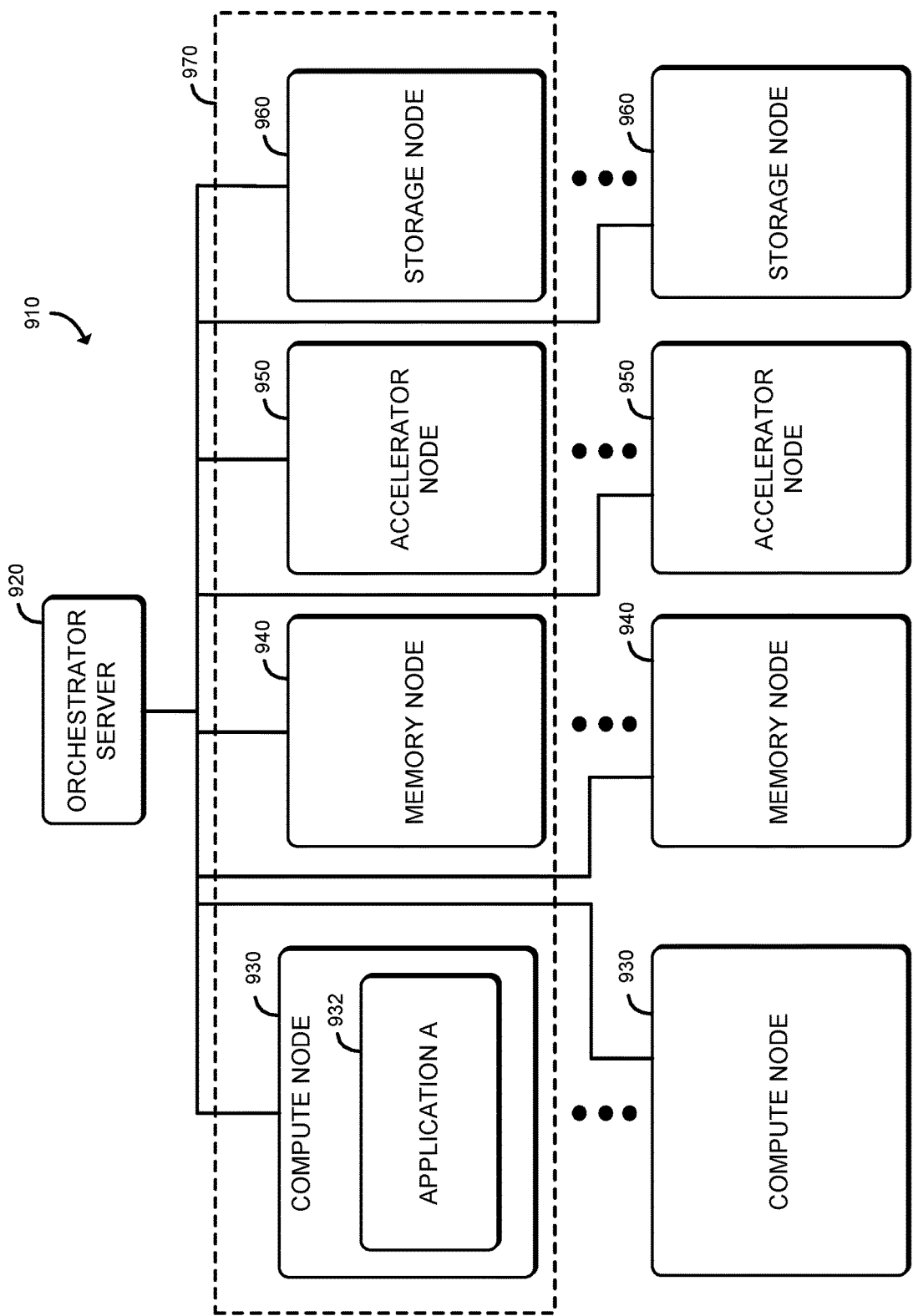
FIG. 9 depicts a system for executing one or more workloads.

Referring now to FIG. 9, a system for executing one or more workloads (e.g., applications or microservices) may be implemented. In the illustrative example, the system 910 includes an orchestrator server 920, which may be embodied as a managed node comprising a compute device (e.g., a processor 520 on a compute node 500) executing management software (e.g., a cloud operating environment, such as OpenStack) that is communicatively coupled to multiple nodes 400 including a large number of compute nodes 930 (e.g., similar to the compute node 500), memory nodes 940 (e.g., similar to the memory node 800), accelerator nodes 950 (e.g., similar to the accelerator node 600), and storage nodes 960 (e.g., similar to the storage node 700). One or more of the nodes 930, 940, 950, 960 may be grouped into a managed node 970, such as by the orchestrator server 920, to collectively perform a workload (e.g., an application 932 executed in a virtual machine or in a container). While orchestrator node 920 is shown as a single entity, alternatively or additionally, its functionality can be distributed across multiple instances and physical locations.

The managed node 970 may be embodied as an assembly of physical resources 320, such as processors 520, memory resources 420, accelerator circuits 620, or data storage 750, from the same or different nodes 400. Further, the managed node may be established, defined, or "spun up" by the orchestrator server 920 at the time a workload is to be assigned to the managed node, and may exist regardless of whether a workload is presently assigned to the managed node. In the illustrative example, the orchestrator server 920 may selectively allocate and/or deallocate physical resources 320 from the nodes 400 and/or add or remove one or more nodes 400 from the managed node 970 as a function of quality of service (QoS) targets (e.g., a target throughput, a target latency, a target number of instructions per second, etc.) associated with a service level agreement or class of service (COS or CLOS) for the workload (e.g., the application 932). In doing so, the orchestrator server 920 may receive telemetry data indicative of performance conditions (e.g., throughput, latency, instructions per second, etc.) in node 400 of the managed node 970 and compare the telemetry data to the quality-of-service targets to determine whether the quality of service targets are being satisfied. The orchestrator server 920 may additionally determine whether one or more physical resources may be deallocated from the managed node 970 while still satisfying the QoS targets, thereby freeing up those physical resources for use in another managed node (e.g., to execute a different workload). Alternatively, if the QoS targets are not presently satisfied, the orchestrator server 920 may determine to dynamically allocate additional physical resources to assist in the execution of the workload (e.g., the application 932) while the workload is executing. Similarly, the orchestrator server 920 may determine to dynamically deallocate physical resources from a managed node if the orchestrator server 920 determines that deallocating the physical resource would result in QoS targets still being met.

Additionally, in some examples, the orchestrator server 920 may identify trends in the resource utilization of the workload (e.g., the application 932), such as by identifying phases of execution (e.g., time periods in which different operations, having different resource utilizations characteristics, are performed) of the workload (e.g., the application 932) and pre-emptively identifying available resources in the data center and allocating them to the managed node 970 (e.g., within a predefined time period of the associated phase beginning). In some examples, the orchestrator server 920 may model performance based on various latencies and a distribution scheme to place workloads among compute nodes and other resources (e.g., accelerator nodes, memory nodes, storage nodes) in the data center. For example, the orchestrator server 920 may utilize a model that accounts for the performance, including optionally previously collected historical performance, of resources on the nodes 400 (e.g., FPGA performance, memory access latency, etc.) and the performance (e.g., congestion, latency, bandwidth) of the path through the network to the resource (e.g., FPGA). As such, the orchestrator server 920 may determine which resource(s) should be used with which workloads based on the total latency associated with potential resource available in the data center 100 (e.g., the latency associated with the performance of the resource itself in addition to the latency associated with the path through the network between the compute node executing the workload and the node 400 on which the resource is located).

In some examples, the orchestrator server 920 may generate a map of heat generation in the data center 100 using telemetry data (e.g., temperatures, fan speeds, etc.) reported from the nodes 400 and allocate resources to managed nodes as a function of the map of heat generation and predicted heat generation associated with different workloads, to maintain a target temperature and heat distribution in the data center 100. Additionally or alternatively, in some examples, the orchestrator server 920 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads with others, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 920 may determine the differences based on the telemetry data stored in the hierarchical model and factor the differences into a prediction of future resource utilization of a workload if the workload is reassigned from one managed node to another managed node, to accurately balance resource utilization in the data center 100. In some examples, the orchestrator server 920 may identify patterns in resource utilization phases of the workloads and use the patterns to predict future resource utilization of the workloads.

To reduce the computational load on the orchestrator server 920 and the data transfer load on the network, in some examples, the orchestrator server 920 may send self-test information to the nodes 400 to enable node 400 to locally (e.g., on the node 400) determine whether telemetry data generated by the node 400 satisfies one or more conditions (e.g., an available capacity that satisfies a predefined threshold, a temperature that satisfies a predefined threshold, etc.). Node 400 may then report back a simplified result (e.g., yes or no) to the orchestrator server 920, which the orchestrator server 920 may utilize in determining the allocation of resources to managed nodes.

Examples described herein can select a storage node 700 or memory node 800 to store data for access by node 400, node 500, or accelerator node 600 to reduce a transit time of data to meet applicable service level agreement (SLA) parameters. Nodes 400 to 800 can be used in a data center or disaggregated composite nodes. The techniques described herein can apply to both disaggregated and traditional server architectures. A traditional server can include a CPU, XPU, one or more memory devices, networking communicatively coupled to one or more circuit boards within a server.

Transport and Cryptography Offload to a Network Interface Device

Some solutions offload data encryption and decryption, from a host system, to a network interface device to reduce latency from protocol processing and reduce utilization of general purpose processors to perform packet protocol processing. However, reliable packet transport management related to packet loss and associated re-transmission of packets can introduce unacceptable tail latencies due to communications between the network interface device that performs the offloaded encryption and the protocol stack in kernel or user space in a host system in order to re-transmit packets.

Various examples offload TLS and kernel TLS (kTLS) and management of reliable packet transport, from a host system, to a network interface device. In some examples, for protocol layer processing performed in the network interface device, the network interface device updates an operating system (OS), executing in the host system, with state information such as message, transport protocol state, and transport protocol and encryption states. Message state can be shared by the network interface device with the OS or application and can include a time when a message transmitted by the network interface device, a time when a message is stored in the network interface device's memory, or timeout condition (e.g., an acknowledgement of packet receipt not being received within a threshold amount of time). Transport protocol state (e.g., Transmission Control Protocol (TCP), RDMA, and so forth) can be shared by the network interface device with the OS or application and can identify messages sent and acknowledgement of packet receipt having been received. Encryption state can be shared by the OS or application with the network interface device and can include a key index to a key store for use in packet encryption. Other meta data and/or state information can be shared between the OS, application, and network interface device.

In some examples, an Infrastructure Programmer's Development Kit (IPDK) driver or library can be used to share state information (e.g., message, packetization, and transport protocol state information) between an OS and network interface device. For example, an IPDK driver or library can copy packet state and message state to the network interface device to allow the network interface device to perform offloaded cryptography operations and management of reliable packet transport. The network interface device can perform protocol processing in an accelerated manner to potentially increase throughput, potentially reduce packet processing latency, and potentially lower the total cost of ownership (TCO) of a central processing unit (CPU).

Figure 10A:
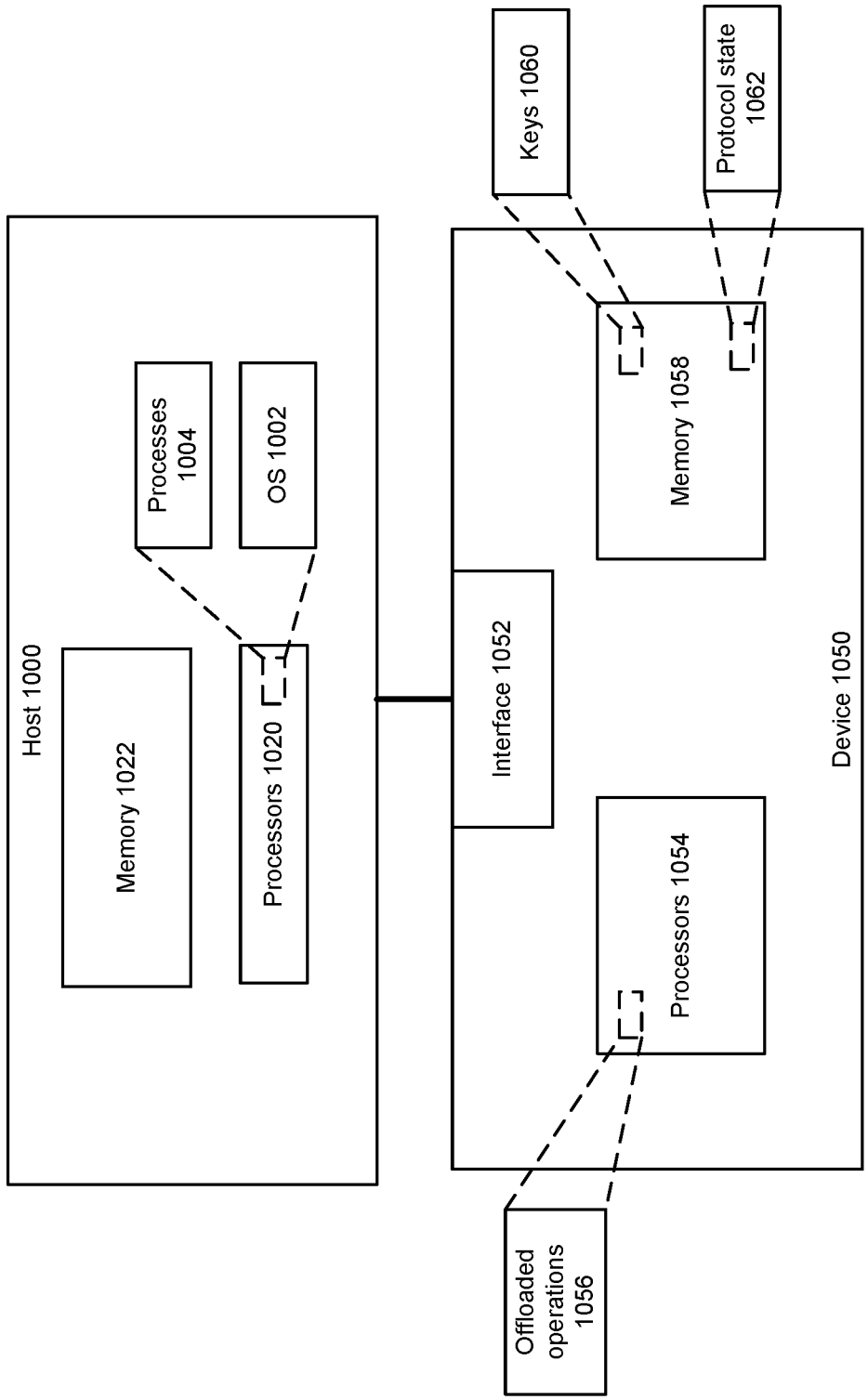
FIG. 10A depicts an example system.

FIG. 10A depicts an example system. Host system 1000 can include or use various processors 1020 and memory 1022 in connection with configuring processors 1054 to perform offloaded packet processing at least in connection with encryption or decryption and reliable packet transport as well as state sharing with operating system (OS) 1002 as well as other operations described herein. Processors 1020 can include an execution core or computational engine that is capable of executing instructions. A core can have access to its own cache and read only memory (ROM), or multiple cores can share a cache or ROM. Cores can be homogeneous and/or heterogeneous devices. Inter-processor communication techniques can be used, such as but not limited to messaging, inter-processor interrupts (IPI), inter-processor communications, and so forth. Cores can be connected in a manner, such as but not limited to, bus, ring, or mesh. Processors 1020 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein.

Operating system (OS) 1002 can execute on one or more of processors 1020. In some examples, OS 1002 can offload at least packet data encryption or decryption and reliable transport as well as protocol layer state sharing to processors 1054 of device 1050. Processes 1004 can execute on one or more of processors 1020. Processes 1004 can request transmission of data in one or more packets using device 1050 and/or process data received in one or more packets from device 1050. Processes 1004 can be implemented as one or more of: a VM, container, microservice, application, thread, and so forth.

Device 1050 can use interface 1052 to communicate with devices, host 1000, and processes 1004 executing on host 1000. In some examples, interface 1052 is compliant with PCIe or CXL, although any other interface could be used. Scalable I/O Virtualization (SIOV) or Single Root I/O Virtualization (SR-IOV) can be used to provide communication between processes 1004 and device 1050 for memory domain isolation per application.

Device 1050 can include one or more of: processors 1054, at least one memory device, at least one storage device, a network interface device, infrastructure processing unit (IPU), data processing unit (DPU), smartNIC, fabric interface, memory, storage, or other devices. Processors 1054 can include one or more of: a CPU, a GPU, an accelerator (e.g., FPGA), a cryptographic accelerator device, a packet processing pipeline, one or more packet processing ASICs, and other devices.

As described herein, among other operations offloaded from host 1000, processors 1054 can perform offloaded operations 1056, including one or more of: containerization application (e.g., sidecar application), packet data encryption or decryption, reliable packet transport, and/or protocol layer state information sharing, as well as other operations described herein. For example, offloaded operations 1056 can include operations of a containerization application or a service mesh for microservices such as looking-up a target Hypertext Transfer Protocol (HTTP) Uniform Resource Locator (URL) to which to send packets and streaming encrypted data to a destination process or device.

As described herein, for communications from and to processes 1004 with another process and/or device connected via device 1050, processors 1020 can execute instructions to form and manage a socket connection (e.g., HTTP). In some examples, processes 1004 can request and initiate use of message encryption (e.g., TLS) over the socket connection. Message encryption can be turned on or off when a connection is established. In some examples, processes 1004 can provide a key index for use in TLS encryption or decryption and offloaded operations 1056 can utilize the key index to identify a key among keys 1060 stored in memory 1058.

TLS is defined at least in The Transport Layer Security (TLS) Protocol Version 1.3, RFC 8446 (August 2018). Data encrypted using TLS is of an arbitrary size and passes from one end of a socket to another end of the socket. A TLS segment can run across a fraction of a TCP packet or across hundreds (or more) of TCP packets. TCP is described for example in RFC 793 (1981). TLS can involve encrypting up to, e.g., 16 KB of data at a time using a cryptographic key agreed upon by two sides of the connection. Periodically, the two sides of the connection can agree to update the key, such as for long-lived connections (e.g., an audio or video stream). Kernel TLS (kTLS) is a Linux kernel implementation of a TLS data path whereby encryption and decryption steps are moved into the kernel and inline with the flow of traffic into and out of a computer or server.

While examples are described with respect to TLS, any cryptography technique can be used such as any transport layer security or any cryptography scheme such as Secure Sockets Layer (SSL), blockchain, Mozilla Network Security Services (NSS), DNS-based Authentication of Named Entities (DANE) (RFC 6698), and so forth.

Processors 1054 can include processors or device for managing transport and cryptography control planes (e.g., handshakes, scoreboards to identify transmitted records, manage re-transmits of one or more packets with a record whose acknowledgement was not received, keeping heartbeats with a connected device, error handling, and so forth). Processors 1054 can include one or more cryptography circuitry for encrypting or decrypting messages based at least on Transport Layer Security (TLS). Processors 1054 can apply packet policy, perform forwarding, perform load balancing among ports, perform per-connection transmit rate control, and other operations.

Direct memory access (DMA) circuitry in device 1050 can be used to copy messages to/from memory for access by processes 1004 and/or processors 1054. In various examples, state synchronization between offloaded operations 1056 and packet protocol layers performed by OS 1002 can occur. For example, protocol state 1062 representing at least packetization and transport protocol states of offloaded operations 1056, as well as other offloaded operations 1056, can be provided to OS 1002.

Various examples of providing communication between host user space and a network interface device are described next. In some examples, state synchronization between the network interface device and stack layers could be configured via a process based on Infrastructure Programmer's Development Kit (IPDK) running on a device driver in OS 1002. IPDK is an extension of Intel's P4 Software Development Environment (SDE). IPDK includes has programming semantics for handling packets (Pkt) which leverages the 2016 version of P4, and semantics for handling messages (Msg). IPDK can be used to provide connectivity between the control and exception planes within the kernel. An IPDK driver or IPDK-based process can be used to access state (e.g., packet state and message state) generated by OS 1002. For example, an IPDK driver or library can copy packet state and message state to memory 1058 of device 1050 to allow device 1050 to perform offload of protocol processing layers. In addition, IPDK driver can cause copying of protocol state 1062 from device 1050 to host 1000 to allow OS 1002 to access such state.

Address Family of the eXpress Data Path (AF_XDP) is a Linux socket type built upon the Extended Berkeley Packet Filter (eBPF) and eXpress Data Path (XDP) technology. An AF_XDP socket receives and sends packets from an eBPF/XDP-based program attached to the network device (netdev) bypassing Linux kernel's subsystems. AF_XDP sockets may enable the possibility for XDP programs to redirect frames to a memory buffer accessible to a user-space application. An AF_XDP socket (XSK) can be created by a socket( ) syscall. XDP or eXpress Data path can provide an in kernel component that processes received packets by a driver. XDP programs can be written as an eBPF program attached to a driver. Instead of using a user space driver, the user space application can directly read or make changes to network packet data and make decisions on how to handle the packet at an earlier stage with the attached XDP program so that the kernel stack may be bypassed in the data path. In some examples, an AF_XDP socket interface can be used to copy data or protocol state from memory 1022 of host 1000 to memory 1058 of device 1050 or from memory 1058 of device 1050 to memory 1022 of host 1000. In some examples, host 1000 can expose an AF_XDP socket extended with User Interrupts to processes 1004 that are to connect to another process or device through a network. In some examples, an AF_XDP socket interface can transfer messages from user space of the sender into a user space of the receiver on the other end.

In some examples, NVIDIA® DOCA™ framework can be used to configure device 1050 and/or copy data or protocol state from memory 1022 of host 1000 to memory 1058 of device 1050 or from memory 1058 of device 1050 to memory 1022 of host 1000.

In some examples, host 1000 can open an HTTP socket to a local host and a containerization application can act as a proxy and form a second connection with a destination process and transmit encrypted data using the second connection. After TCP segmentation of data, device 1050 can perform TLS encryption and decryption of TLS records at a packet level.

Figure 10B:
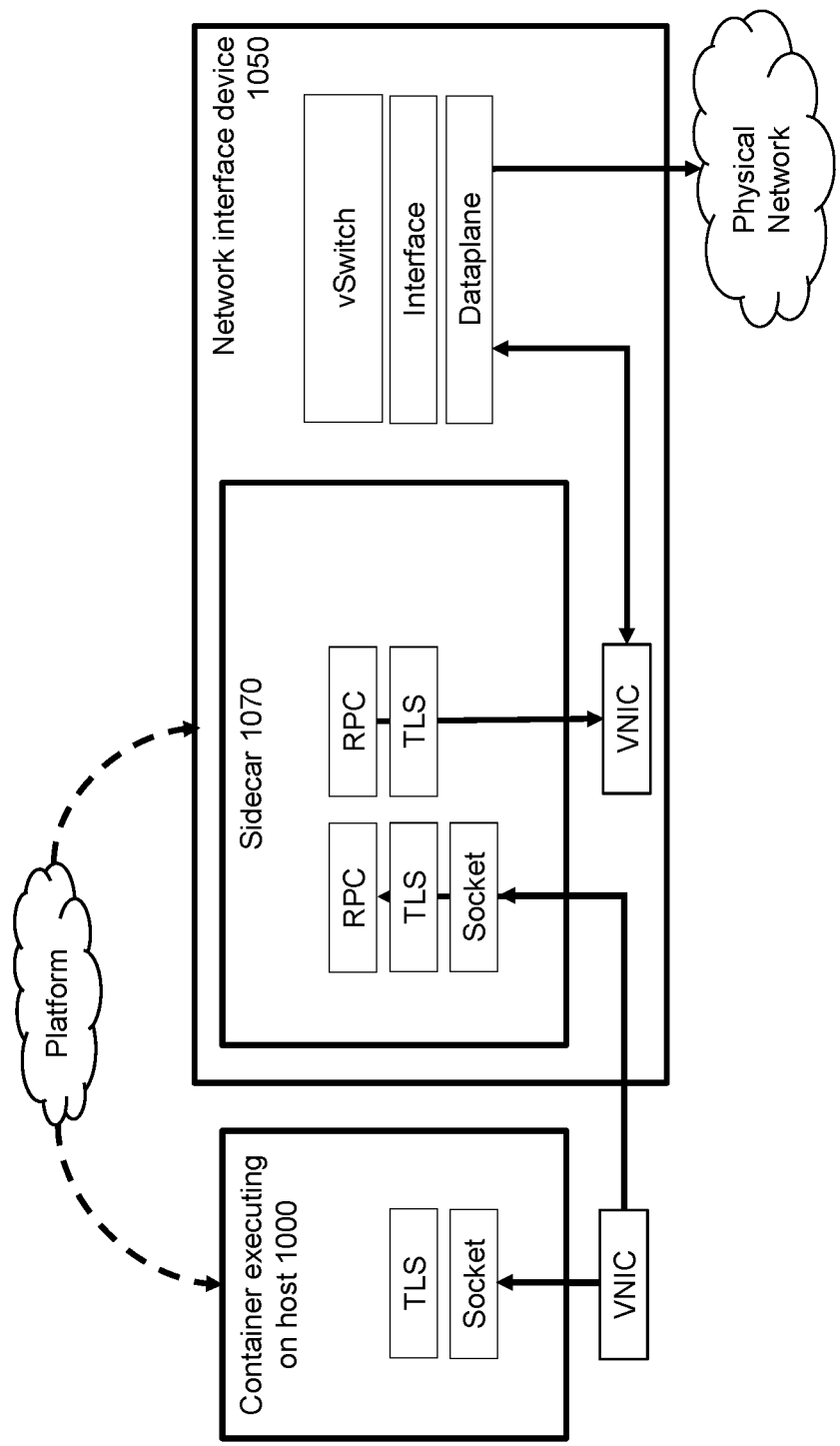
FIG. 10B depicts an example system.

FIG. 10B depicts an example system in which a proxy communications can be offloaded to a network interface device. According to some examples, one or more records can be copied from host 1000 to device 1050 and processors 1054 can perform TLS encryption on at least one of the records (e.g., 16 KB or other size), on a record-by-record basis. When the encrypted record is to be transmitted, processors 1054 can add transport layer protocol headers (e.g., TCP/IP, RDMA) to one or more packets to transmit the encrypted record in one or more packets. Sidecar application 1070 (e.g., containerization application) can execute on one or more processors of network interface device 1050 (e.g., processors 1054) and provide a proxy for a container executing on host 1000. Side car application 1070 can determine a destination HTTP URL for the one or more packets. Device 1050 can open a user space socket with a target process based on an HTTP URL and send encrypted records with added transport layer information as a data stream through the socket. The streamed encrypted records can be placed within one or more packets and transmitted to a destination.

Figure 11:
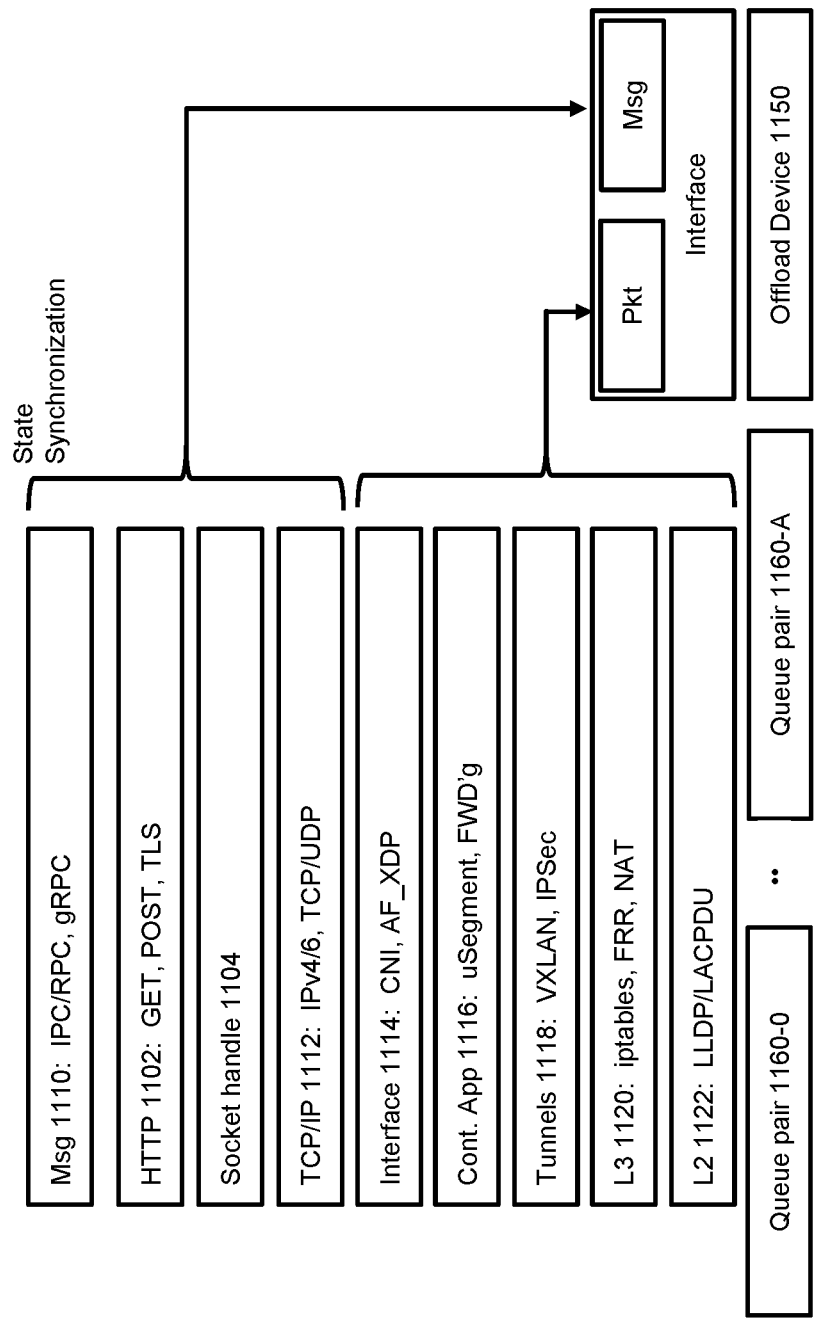
FIG. 11 depicts an example operation.

FIG. 11 depicts an example of operations performed in the offload device and host server. For example, the operation can correspond to operations performed by the systems of FIGS. 10A and 10B. Formation and management of a Hypertext Transfer Protocol (HTTP) connection 1102 can be executed in a server. A process executed by a server can use HTTP connection 1102 to provide a connection interface with a target process. HTTP connection 1102 can receive socket information such as message state and transport protocol state from offload device 1150 (e.g., network interface device). HTTP connection 1102 can provide a web server interface for HTTP POST requests and HTTP GET requests to access a URL and perform actions. In other examples, HTTP connection 1102 can be performed by offload device 1150.

Message-based protocols 1110 (e.g., TCP/IP, inter-process communication (IPC), Remote Procedure Call (RPC), or gRPC), transport layer 1112, interface 1114, containerization application (e.g., sidecar application) 1116, tunnels 1118, layer 3 (L3) communications 1120, and layer 2 (L2) communications 1122 as well as control and exception planes can be offloaded and performed by offload device 1150.

Using a user space offload interface, a message can be copied from a host to hardware offload path to a offload device 1150 using, for example, a DMA circuitry. A user space message send/receive allows copying messages to/from the application (e.g., offloaded by Msg interface 1110 in IPDK). Offload device 1150 can provide interface semantics offered by RPCs.

Messages can span multiple packets and offload device 1150 can perform encryption or decryption of messages and include encrypted portions of a message in one or more packets. For example, a message can include one or more records (e.g., cleartext records or encrypted records). For example, messages that are part of a remote procedure call (RPC) could be transmitted over HTTP/TLS directed to a target service using multiple packets transmitted from a port.

For packet transmit, one or more of the following can be offloaded to be performed by offload device 1150: packet formation (e.g., formation of headers and combination with payloads), message encryption, transmission of encrypted messages over a socket, and management of packet receipt. In some examples, offload device 1150 can perform transmissions through a socket identified by socket handle 1104 on behalf of an application executed by a host. Socket handle 1104 can refer to a file descriptor (e.g., Linux) or a file handle (e.g., Windows) and a connection identifier (e.g., a file). Offload device 1150 can receive socket handle 1104 from the OS executed by the host. Socket handle 1104 can have an associated hardware queue among queue pairs 1160-0 to 1160-A (A is an integer of 1 or more) for one or more messages (Msgs) of the socket to be transmitted or received. Offload device 1150 can write a message to a file to transmit data.

For received packets, one or more of the following can be offloaded to be performed by offload device 1150: receipt of encrypted messages over a socket, packet processing (e.g., parsing of headers) and message decryption.

Figure 12:
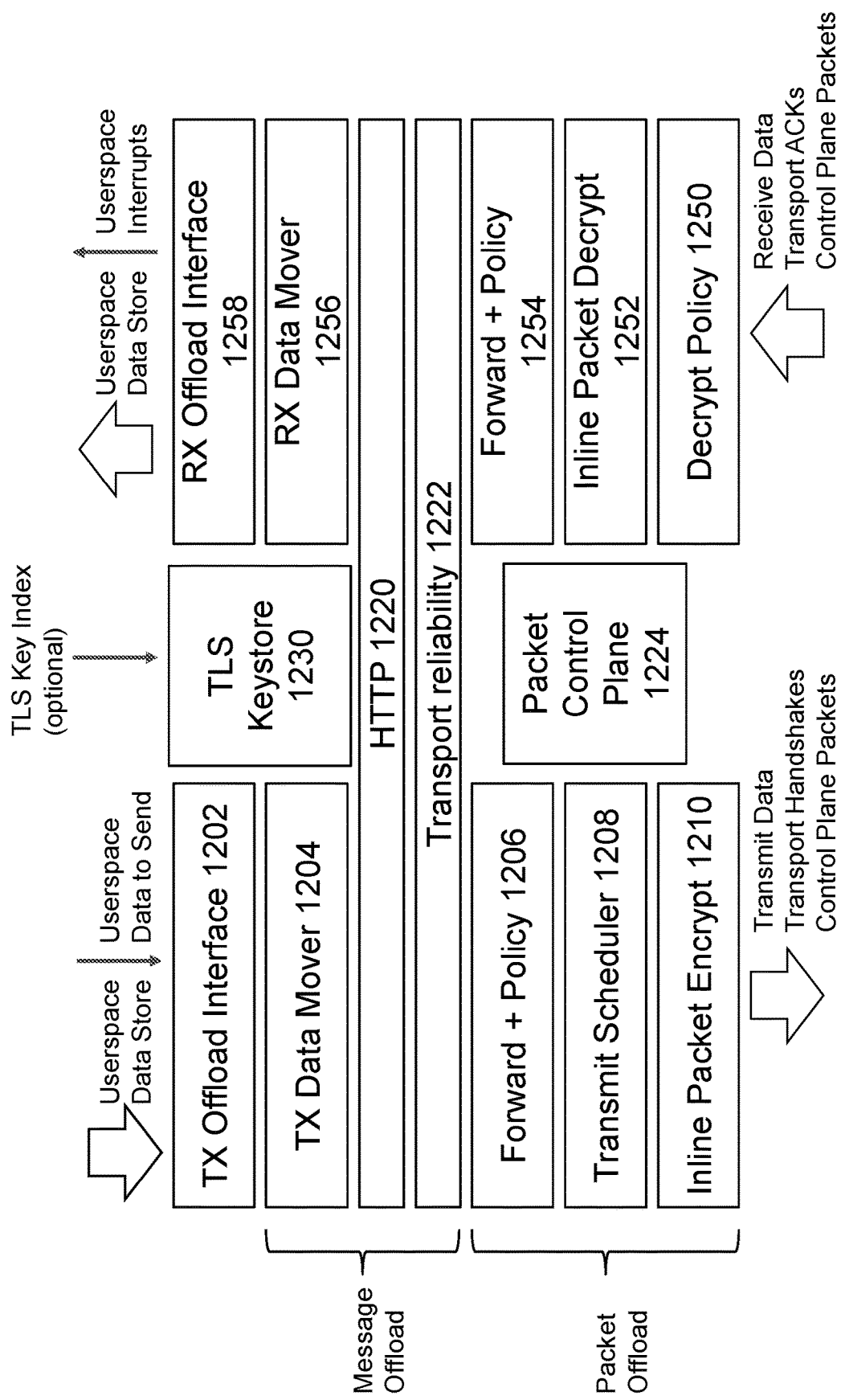
FIG. 12 depicts an example of operation of a network interface device.

FIG. 12 depicts an example of operation of a network interface device. An example transmit (TX) flow can be as follows. To establish a connection with a target process or device, a sender (e.g., application, microservice, virtual machine (VM), container) can request a connection to a remote destination. The processors in the network interface device can negotiate with a remote target to agree on a transport and cryptography policies.

To send a message, a sender can build a message and provide the message to the network interface device via TX offload interface 1202. In some examples, TX offload interface 1202 can be an AF_XDP socket, although other frameworks can be used, such as a virtual network device, that copies data from user space to the network interface. TX offload interface 1202 can copy the message to the network interface device can utilize a queue accessible in user space (e.g., a transmit queue of a queue pair) and by the network interface device. In some examples, a sender indicates a message processing is to be offloaded to the network interface device. A message can include or more TLS records.

Transmit (TX) data mover 1204 can copy data from host memory and provide the data to processors in the network interface device. For example, in some examples, message encryption (e.g., TLS offload) can be performed in the data mover (e.g., DMA circuitry). For example, a key applied for encryption (and decryption) can be identified using a key index from a sender and the key can be retrieved from key store 1230.

Hardware forwarding and policy enforcement 1206 can determine a destination for the message and check for admission control and connection tracking. Hardware forwarding and policy enforcement 1206 can perform packet segmentation and apply forwarding rules, as offloaded from the host stack to the network interface device using state from the host stack.

Hardware transmit scheduling 1208 can provide a set of traffic rate limiters for data transmitted from the network interface device. If one or more of the limiters exceed a limit, the data can be held in memory until the limit is not exceeded.

Packet encrypt 1210 can apply encryption per packet. For example, Internet Protocol Security (IPsec) (e.g., based on RFC 6434 (2011)) can be used to encrypt a packet.

HTTP circuitry 1220 can perform encryption of data messages related to HTTP GET, HTTP POST, TLS, and so forth. For example, HTTP circuitry 1220 can perform TLS encryption of a record based on a key retrieved from key store 1230 prior to allocation of the encrypted record into one or more packets.

Transport reliability 1222 can manage receipt of acknowledgement (ACK) packets from a target that indicate a packet was received. Failure to receive an ACK for a packet, which may arise from packet loss, can trigger re-transmitting the packet. Transport reliability 1222 can detect packet loss and re-queue the packet for transmission. Reliable transport can be based on one or more of: Transmission Control Protocol (TCP), User Datagram Protocol (UDP), quick UDP Internet Connections (QUIC), RDMA over Converged Ethernet (RoCE), or other transport layer protocols. Packet control plane 1224 can manage packet re-transmissions. The network interface device can buffer data in case a packet re-transmit is to occur. Buffers can be in a network interface device or system memory.

An example transmit flow to provide a message for TLS encryption can be as follows. At (1), an AF_XDP socket offload using a PCIe message and user space Windows® MSIX event and a microcode programmable DMA engine. User space meta data information can be passed using a data_meta region of an XDP buffer.

At (2), the DMA engine can fetch an AF_XDP work request and meta data for access by processors (e.g., embedded cores) of the network interface device in response to a doorbell issued from AF_XDP queues on the host. At (3), the processors of the network interface device can execute a Transport (TLS TCP) stack to utilize a lookaside crypto engine to encrypt one or more records of a message. Encryption of the packet can be performed while the packet is stored in host memory or while the one or more records are stored in memory of the network interface device. At (4), the processors of the network interface device can utilize an offload circuitry to perform TCP segmentation offload for transmitting the encrypted and segmented packets.

An example receive (RX) operation at the network interface device is as follows. Decrypt policy 1250 can determine if decryption is to be performed on the packet and its content. Hardware decrypt 1252 can perform decryption of content of the packet, if packet decryption is to be applied. For example, IPSec decryption (e.g., based on RFC 6434 (2011)) can be performed on the packet. Forward and policy 1254 can process the decrypted packet for forwarding and policy enforcement to apply forwarding and policy enforcement on decrypted packet after IPsec decryption. In some cases, the packet is to be forwarded to another network interface device using a transmit pipeline.

HTTP circuitry 1220 can perform decryption of data messages based on TLS. For example, after reconstruction of a record from one or more packets, HTTP circuitry 1220 can perform decryption of a record based on a key retrieved from key store 1230.

Data mover 1256 can copy the decrypted message into a buffer accessible in user space. The data can be placed into the user space buffer directly using a scatter/gather approach (e.g., using a scatter gather list (SGL)), based on the memory map set up in user space. A user space interrupt can notify a receiver (application) that a message has received. RX offload interface 1258 can utilize similar technologies as interface 1202, except to write data to a buffer in host.

An example receive flow of a message is as follows. At (1), embedded software running on network interface device can post receive buffers onto a host via AF_XDP socket. At (2), the network interface device can receive a packet reception event. At (3), after an entirety of a record is received, the network interface device can use a crypto circuitry to decrypt the record. At (4), the network interface device can provide the packet as one a payload to the host using a DMA circuitry. At (5), the DMA circuitry can copy the TLS related meta data information into the data_meta region of XDP buffer and indicate availability of a packet in user space to a recipient process. At (6), host AF_XDP RX queue can receive events about packet arrival using User MSIX event.

Figure 13:
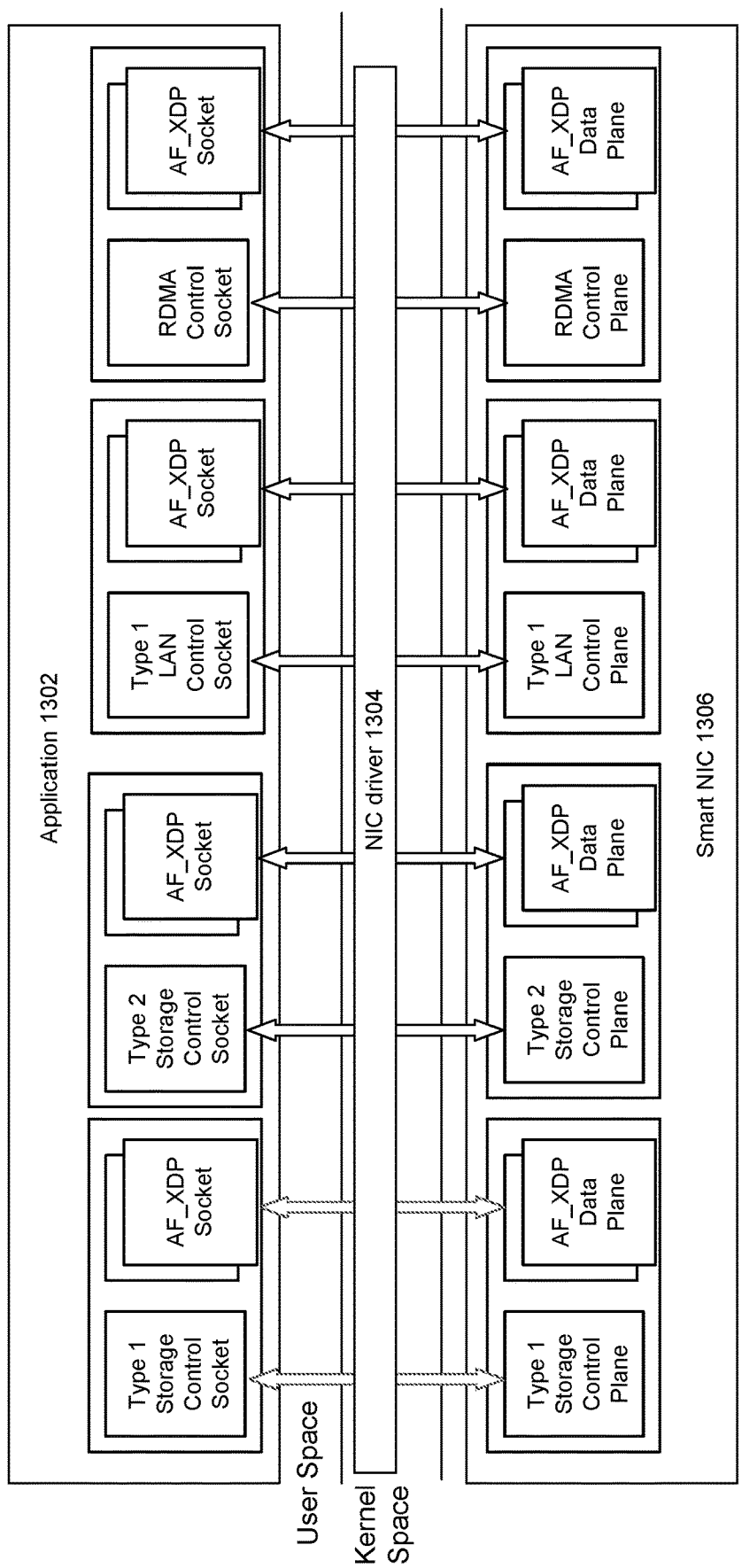
FIG. 13 depicts an example system.

FIG. 13 depicts an example system. The following provides an example of setting up a socket or communication channel between an application 1302 (e.g., application, microservice, container, virtual machine, or other execution environment) with network interface device 1306. In some examples, network interface device 1306 includes a control plane executed on a processor of the network interface device. Application 1302 can create a control socket by calling a NIC driver 1304. Application 1302 can provide configuration parameters to a control plane of network interface device 1306. Configuration parameters can include a destination IP address for one or more packets that are to be transmitted at the request of application 1302. NIC driver 1304 can use a PCIe base address register (BAR) or memory-mapped I/O (MMIO) to send configuration parameters to network interface device 1306 to configure network interface device 1306. Configuration parameters can be the same or different for storage, local area network (LAN) and remote direct memory access (RDMA) communications using network interface device 1306.

Application 1302 can request NIC driver 1304 to create an AF_XDP socket. In some examples, NIC driver 1304 can communicate with a control plane in network interface device 1306 to configure the AF_XDP socket to allow application 1302 to communicate using AF_XDP queues. Application 1302 can identify a network packet payload to network interface device 1306 directly using a descriptor in an AF_XDP queue, provide a storage packet payload (e.g., using a DMA copy operation) or send remote direct memory access (RDMA) packet payload.

Figure 14A:
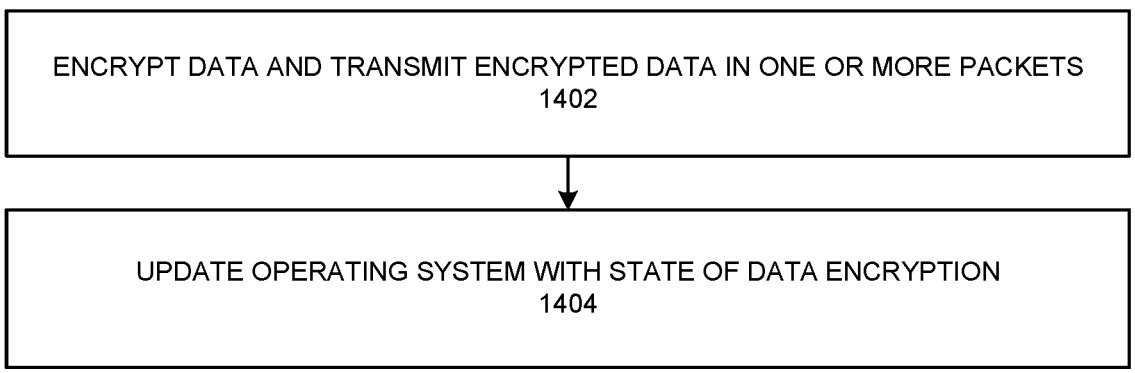
FIGS. 14A-14C depict example processes.
Figure 14B:
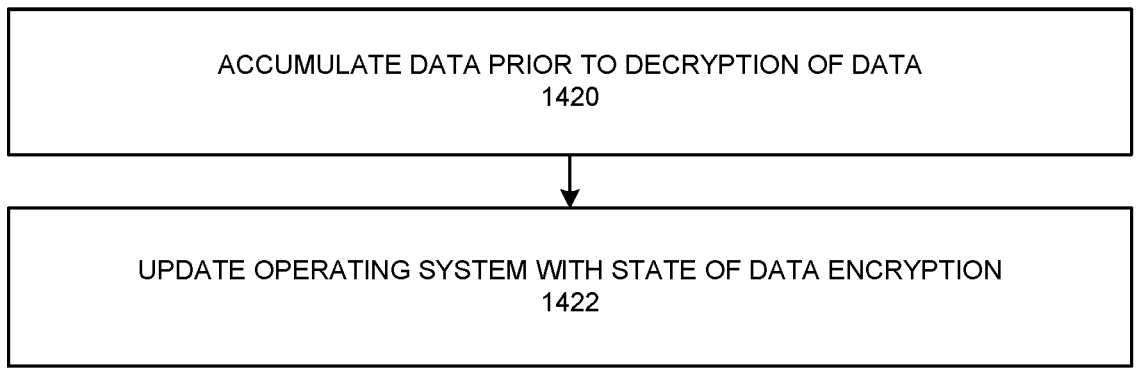
Figure 14C:
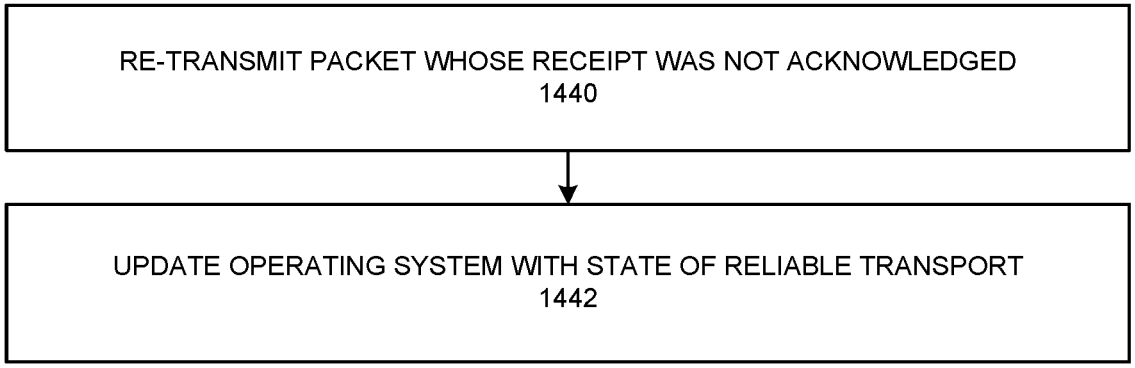

FIGS. 14A-14C depict example processes that can be performed by a network interface device configured to perform offloaded operations of Transport Layer Security (TLS) encryption and/or decryption and reliable packet transport from a host server system. FIG. 14A depicts an example process. A network interface device can perform the process to perform operations of data encryption. At 1402, in response to a request to transmit a packet, a network interface device can encrypt a data and segment the encrypted data into one or more packets and transmit the one or more packets. For example, data can include one or more records. For example, encryption can be performed on one or more records. A side car operation can be performed on the network interface device to provide communications using an HTTP URL to a destination. At 1404, the network interface device can update an operating system (OS) executing on the host server system with state information related at least to TLS for use in managing HTTP communication.

FIG. 14B depicts an example process. A network interface device can perform the process to perform operations of data decryption. At 1420, based on the received packet including encrypted data, the network interface device can gather an entire record and decrypt the entire record. For example, TLS decryption can be performed on the entire record. At 1422, the network interface device can update an OS executing on the host server system with state information related at least to TLS.

FIG. 14C depicts an example process. A network interface device can perform the process in connection with performing reliable packet transport. At 1440, based on non-receipt of an acknowledgement signal, the network interface device can re-transmit a packet whose receipt was not acknowledged to the network interface device. For example, acknowledgement of receipt of a packet can be made based on receipt of an acknowledgement packet by the network interface device within an amount of time after the packet was transmitted. The network interface device can identify the packet as having receipt acknowledged if an acknowledgement of receipt from a destination device, that received a packet with an encrypted portion of a record, was received within the amount of time. At 1442, the network interface device can update an OS executing on the host server system with state information related to reliable transport.

Figure 15:
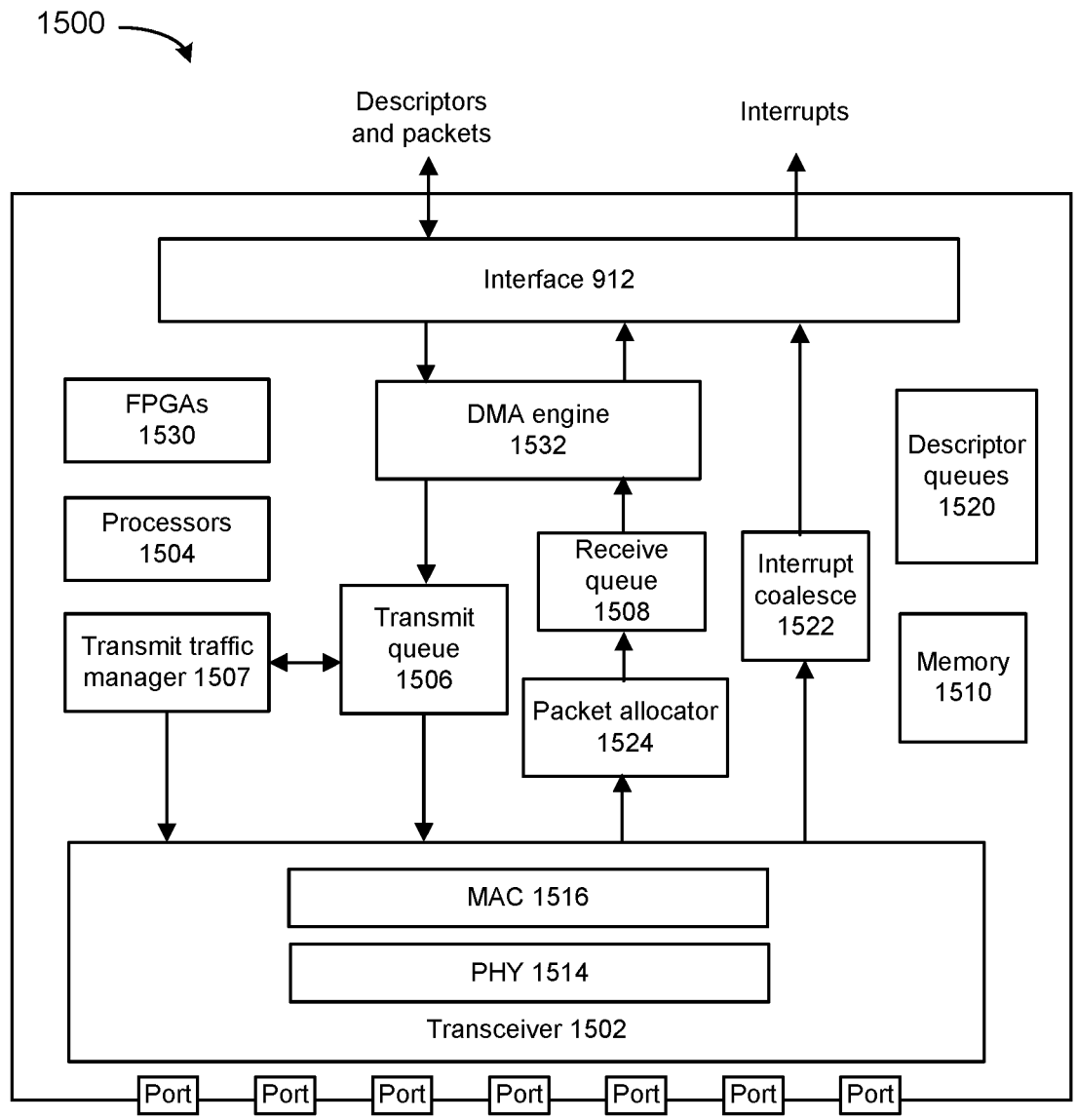
FIG. 15 depicts an example network interface device.

FIG. 15 depicts an example network interface device. Various processor resources in the network interface can perform offloaded operations, from a host server system, of Transport Layer Security (TLS) (TLS) encryption and/or decryption, reliable packet transport, and side car proxy operations to send packets and receive packets from a target partner. In some examples, network interface 1500 can be implemented as a network interface controller, network interface card, a host fabric interface (HFI), or host bus adapter (HBA), and such examples can be interchangeable. Network interface 1500 can be coupled to one or more servers using a bus, PCIe, CXL, or DDR. Network interface 1500 may be embodied as part of a system-on-a-chip (SoC) that includes one or more processors, or included on a multichip package that also contains one or more processors.

Some examples of network device 1500 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 1500 can include transceiver 1502, processors 1504, transmit queue 1506, receive queue 1508, memory 1510, and bus interface 1512, and DMA engine 1532. Transceiver 1502 can be capable of receiving and transmitting packets in conformance with the applicable protocols such as Ethernet as described in IEEE 802.3, although other protocols may be used. Transceiver 1502 can receive and transmit packets from and to a network via a network medium (not depicted). Transceiver 1502 can include PHY circuitry 1514 and media access control (MAC) circuitry 1516. PHY circuitry 1514 can include encoding and decoding circuitry (not shown) to encode and decode data packets according to applicable physical layer specifications or standards. MAC circuitry 1516 can be configured to perform MAC address filtering on received packets, process MAC headers of received packets by verifying data integrity, remove preambles and padding, and provide packet content for processing by higher layers. MAC circuitry 1516 can be configured to assemble data to be transmitted into packets, that include destination and source addresses along with network control information and error detection hash values.

Processors 1504 can be any a combination of a: processor, core, graphics processing unit (GPU), field programmable gate array (FPGA), application specific integrated circuit (ASIC), or other programmable hardware device that allow programming of network interface 1500. For example, a "smart network interface" or SmartNIC can provide packet processing capabilities in the network interface using processors 1504.

Processors 1504 can include a programmable processing pipeline that is programmable by Programming Protocol-independent Packet Processors (P4), C, Python, Broadcom Network Programming Language (NPL), or x86 compatible executable binaries or other executable binaries. A programmable processing pipeline can include one or more match-action units (MAUs) that can schedule packets for transmission using one or multiple granularity lists, as described herein. Processors, FPGAs, other specialized processors, controllers, devices, and/or circuits can be used utilized for packet processing or packet modification. Ternary content-addressable memory (TCAM) can be used for parallel match-action or look-up operations on packet header content. In some examples, processors 1504 can perform offloaded operations of Transport Layer Security (TLS) (TLS) encryption and/or decryption, proxy operations to send packets and receive packets from a target partner, and reliable packet transport from a host server system.

Transmit traffic manager 1507 can select a packet to allocate to a transmit time slot from among queues. Transmit traffic manager 1507 can be implemented as part of processors 1504 and/or FPGAs 1530.

Packet allocator 1524 can provide distribution of received packets for processing by multiple CPUs or cores using receive side scaling (RSS). When packet allocator 1524 uses RSS, packet allocator 1524 can calculate a hash or make another determination based on contents of a received packet to determine which CPU or core is to process a packet.

Interrupt coalesce 1522 can perform interrupt moderation whereby network interface interrupt coalesce 1522 waits for multiple packets to arrive, or for a time-out to expire, before generating an interrupt to host system to process received packet(s). Receive Segment Coalescing (RSC) can be performed by network interface 1500 whereby portions of incoming packets are combined into segments of a packet. Network interface 1500 provides this coalesced packet to an application.

Direct memory access (DMA) engine 1532 can copy a packet header, packet payload, and/or descriptor directly from host memory to the network interface or vice versa, instead of copying the packet to an intermediate buffer at the host and then using another copy operation from the intermediate buffer to the destination buffer.

Memory 1510 can be any type of volatile or non-volatile memory device and can store any queue or instructions used to program network interface 1500. Transmit queue 1506 can include data or references to data for transmission by network interface. Receive queue 1508 can include data or references to data that was received by network interface from a network. Descriptor queues 1520 can include descriptors that reference data or packets in transmit queue 1506 or receive queue 1508. Bus interface 1512 can provide an interface with host device (not depicted). For example, bus interface 1512 can be compatible with or based at least in part on PCI, PCI Express, PCI-x, Serial ATA, and/or USB (although other interconnection standards may be used), or proprietary variations thereof.

Figure 16:
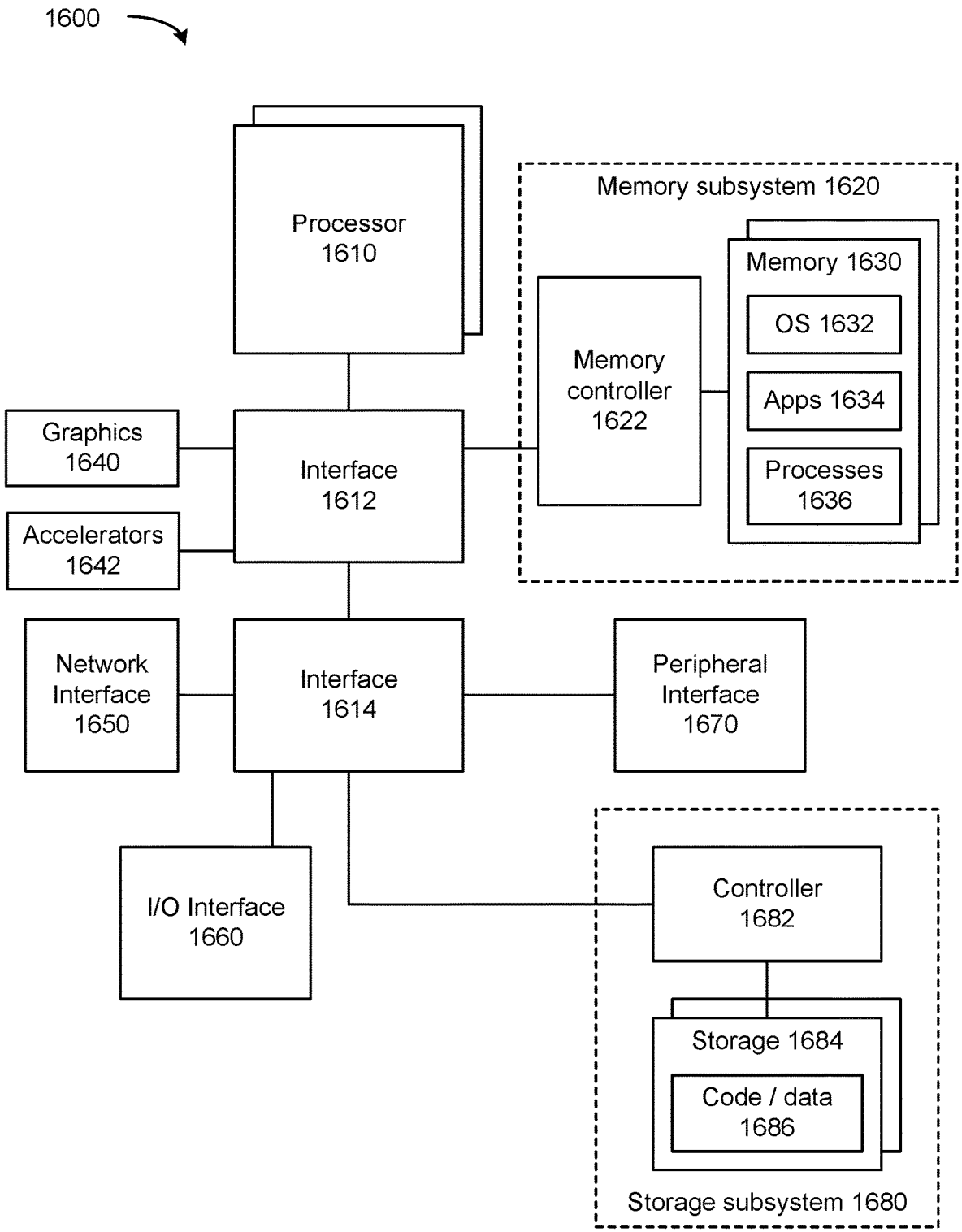
FIG. 16 depicts an example system.

FIG. 16 depicts an example computing system. Various examples can offload encryption and decryption capabilities, reliable packet transport to one or more components of system 1600 (e.g., processor 1610, network interface 1650, and so forth), and side car operations, as described herein. System 1600 includes processor 1610, which provides processing, operation management, and execution of instructions for system 1600. Processor 1610 can include any type of microprocessor, central processing unit (CPU), graphics processing unit (GPU), processing core, or other processing hardware to provide processing for system 1600, or a combination of processors. Processor 1610 controls the overall operation of system 1600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1600 includes interface 1612 coupled to processor 1610, which can represent a higher speed interface or a high throughput interface for system components that needs higher bandwidth connections, such as memory subsystem 1620 or graphics interface components 1640, or accelerators 1642. Interface 1612 represents an interface circuit, which can be a standalone component or integrated onto a processor die. Where present, graphics interface 1640 interfaces to graphics components for providing a visual display to a user of system 1600. In one example, graphics interface 1640 can drive a high definition (HD) display that provides an output to a user. In one example, graphics interface 1640 generates a display based on data stored in memory 1630 or based on operations executed by processor 1610 or both. In one example, graphics interface 1640 generates a display based on data stored in memory 1630 or based on operations executed by processor 1610 or both.

Accelerators 1642 can be a fixed function or programmable offload engine that can be accessed or used by a processor 1610. For example, an accelerator among accelerators 1642 can provide compression (DC) capability, cryptography services such as public key encryption (PKE), cipher, hash/authentication capabilities, decryption, or other capabilities or services. In some examples, in addition or alternatively, an accelerator among accelerators 1642 provides field select controller capabilities as described herein. In some cases, accelerators 1642 can be integrated into a CPU socket (e.g., a connector to a motherboard or circuit board that includes a CPU and provides an electrical interface with the CPU). For example, accelerators 1642 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 1642 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1620 represents the main memory of system 1600 and provides storage for code to be executed by processor 1610, or data values to be used in executing a routine. Memory subsystem 1620 can include one or more memory devices 1630 such as read-only memory (ROM), flash memory, one or more varieties of random access memory (RAM) such as DRAM, or other memory devices, or a combination of such devices. Memory 1630 stores and hosts, among other things, operating system (OS) 1632 to provide a software platform for execution of instructions in system 1600. Additionally, applications 1634 can execute on the software platform of OS 1632 from memory 1630. Applications 1634 represent programs that have their own operational logic to perform execution of one or more functions. Processes 1636 represent agents or routines that provide auxiliary functions to OS 1632 or one or more applications 1634 or a combination. OS 1632, applications 1634, and processes 1636 provide software logic to provide functions for system 1600. In one example, memory subsystem 1620 includes memory controller 1622, which is a memory controller to generate and issue commands to memory 1630. It will be understood that memory controller 1622 could be a physical part of processor 1610 or a physical part of interface 1612. For example, memory controller 1622 can be an integrated memory controller, integrated onto a circuit with processor 1610.

In some examples, OS 1632 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others. Various examples of drivers used to configure a network interface device to perform offloaded operations of Transport Layer Security (TLS) and kernel TLS (kTLS) encryption and/or decryption, reliable packet transport, and/or side car operations from a host server system. A driver executed by a processor can advertise capabilities to an application or other process of a network interface device to perform offloaded operations of TLS and/or kTLS encryption and/or decryption, reliable packet transport, and/or side car operations from a host server system.

While not specifically illustrated, it will be understood that system 1600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1600 includes interface 1614, which can be coupled to interface 1612. In one example, interface 1614 represents an interface circuit, which can include standalone components and integrated circuitry. In one example, multiple user interface components or peripheral components, or both, couple to interface 1614. Network interface 1650 provides system 1600 the ability to communicate with remote devices (e.g., servers or other computing devices) over one or more networks. Network interface 1650 can include an Ethernet adapter, wireless interconnection components, cellular network interconnection components, USB (universal serial bus), or other wired or wireless standards-based or proprietary interfaces. Network interface 1650 can transmit data to a device that is in the same data center or rack or a remote device, which can include sending data stored in memory. Network interface 1650 can receive data from a remote device, which can include storing received data into memory. Various examples of network interface 1650 can perform at least offloaded encryption and decryption operations, reliable packet transport, and side car operations, as described herein.

Some examples of network interface 1650 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 1600 includes one or more input/output (I/O) interface(s) 1660. I/O interface 1660 can include one or more interface components through which a user interacts with system 1600 (e.g., audio, alphanumeric, tactile/touch, or other interfacing). Peripheral interface 1670 can include any hardware interface not specifically mentioned above. Peripherals refer generally to devices that connect dependently to system 1600. A dependent connection is one where system 1600 provides the software platform or hardware platform or both on which operation executes, and with which a user interacts.

In one example, system 1600 includes storage subsystem 1680 to store data in a nonvolatile manner. In one example, in certain system implementations, at least certain components of storage 1680 can overlap with components of memory subsystem 1620. Storage subsystem 1680 includes storage device(s) 1684, which can be or include any conventional medium for storing large amounts of data in a nonvolatile manner, such as one or more magnetic, solid state, or optical based disks, or a combination. Storage 1684 holds code or instructions and data 1686 in a persistent state (e.g., the value is retained despite interruption of power to system 1600). Storage 1684 can be generically considered to be a "memory," although memory 1630 is typically the executing or operating memory to provide instructions to processor 1610. Whereas storage 1684 is nonvolatile, memory 1630 can include volatile memory (e.g., the value or state of the data is indeterminate if power is interrupted to system 1600). In one example, storage subsystem 1680 includes controller 1682 to interface with storage 1684. In one example controller 1682 is a physical part of interface 1614 or processor 1610 or can include circuits or logic in both processor 1610 and interface 1614.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies by JEDEC (Joint Electronic Device Engineering Council).

A non-volatile memory (NVM) device is a memory whose state is determinate even if power is interrupted to the device. In one example, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), or a combination of one or more of the above, or other memory.

A power source (not depicted) provides power to the components of system 1600. More specifically, power source typically interfaces to one or multiple power supplies in system 1600 to provide power to the components of system 1600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1600 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be written to or read from virtualized storage nodes or memory pools using a protocol such as NVMe over Fabrics (NVMe-oF) or NVMe.

Examples herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade can include components common to conventional servers, including a main printed circuit board (main board) providing internal wiring (e.g., buses) for coupling appropriate integrated circuits (ICs) and other components mounted to the board.

In some examples, network interface and other examples described herein can be used in connection with a base station (e.g., 3G, 4G, 5G and so forth), macro base station (e.g., 5G networks), picostation (e.g., an IEEE 802.11 compatible access point), nanostation (e.g., for Point-to-Multi-Point (PtMP) applications), on-premises data centers, off-premises data centers, edge network elements, edge servers, edge switches, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, system-on-chip (SoC), and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or examples. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in examples.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative examples. Furthermore, additional operations may be added or removed depending on the particular applications. Any combination of changes can be used and one of ordinary skill in the art with the benefit of this disclosure would understand the many variations, modifications, and alternative examples thereof.

Disjunctive language such as the phrase "at least one of X, Y, or Z," unless specifically stated otherwise, is otherwise understood within the context as used in general to present that an item, term, etc., may be either X, Y, or Z, or combination thereof (e.g., X, Y, and/or Z). Thus, such disjunctive language is not generally intended to, and should not, imply that certain examples require at least one of X, at least one of Y, or at least one of Z to each be present. Additionally, conjunctive language such as the phrase "at least one of X, Y, and Z," unless specifically stated otherwise, should also be understood to mean X, Y, Z, or combination thereof, including "X, Y, and/or Z.'"

Illustrative examples of the devices, systems, and methods disclosed herein are provided below. An example of the devices, systems, and methods may include one or more, and combination of, the examples described below.

Example 1 includes one or more examples and includes an apparatus comprising: a network interface device comprising circuitry to perform encryption of data, circuitry to generate one or more packets from the encrypted data, circuitry to cause transmission of the one or more packets with the encrypted data, circuitry to manage reliability of transport of the transmitted one or more packets with the encrypted data, and circuitry to share protocol state information between a host system and the network interface device using connectivity based on user space accessible queues.

Example 2 includes one or more examples, wherein the circuitry to manage reliability of transport of the transmitted one or more packets is to manage packet receipt and packet retransmission.

Example 3 includes one or more examples, wherein the network interface device comprises circuitry to receive protocol state information from a host system and to share protocol state information with the host system.

Example 4 includes one or more examples, wherein the protocol state information comprises information related to one or more of: state for packetization, reliable transport, congestion management, packet encryption, packet decryption, and security association.

Example 5 includes one or more examples, wherein the circuitry to share protocol state information between a host system and the network interface device using connectivity based on user space accessible queues is to provide connectivity based on one or more of: Infrastructure Programmer's Development Kit (IPDK), NVIDIA® DOCA™, or AF_XDP.

Example 6 includes one or more examples, wherein the circuitry to perform encryption of data is to receive a reference to a key from the host system and the circuitry to perform encryption of data is to access the key based on the reference and encrypt the data based on the key.

Example 7 includes one or more examples, wherein the encryption of data comprises Transport Layer Security (TLS) encryption of at least one record.

Example 8 includes one or more examples, wherein the circuitry to cause transmission of the one or more packets with the encrypted data is to look-up a target Hypertext Transfer Protocol (HTTP) Uniform Resource Locator (URL) to which to send the one or more packets and stream encrypted data the target HTTP URL.

Example 9 includes one or more examples, wherein the network interface device comprises one or more of: a network interface controller (NIC), a remote direct memory access (RDMA)-enabled NIC, SmartNIC, router, switch, forwarding element, infrastructure processing unit (IPU), data processing unit (DPU), or network-attached appliance.

Example 10 includes one or more examples, and includes the host system coupled to the network interface device, wherein the host system is to configure the network interface device to perform encryption of data, generate one or more packets from the encrypted data, cause transmission of the one or more packets with the encrypted data, manage reliability of transport of the transmitted one or more packets with the encrypted data, and share protocol state information between a host system and the network interface device using connectivity based on user space accessible queues.

Example 11 includes one or more examples, wherein the host system is to initiate and manage a Hypertext Transfer Protocol (HTTP) connection with a target device.

Example 12 includes one or more examples, and includes a datacenter comprising a second server to receive the encrypted data in the one or more packets from the network interface device.

Example 13 includes one or more examples, and includes a computer-readable medium comprising instructions stored thereon, that if executed by one or more processors, cause the one or more processors to: configure a network interface device to perform operations offloaded by a server to the network interface device, wherein the operations comprise: perform cryptography operations on data, transmit encrypted data in one or more packets, look-up of a target Hypertext Transfer Protocol (HTTP) Uniform Resource Locator (URL) to which to send the one or more packets and stream encrypted data the target HTTP URL, and manage reliability of transport of the transmitted one or more packets is to manage packet receipt and packet retransmission.

Example 14 includes one or more examples, wherein the network interface device is to share protocol state information with the server using connectivity based on user space accessible queues.

Example 15 includes one or more examples, wherein the protocol state information comprises information related to one or more of: state for packetization, reliable transport, congestion management, packet encryption, packet decryption, and security association.

Example 16 includes one or more examples, wherein the network interface device is to share protocol state information with the server using connectivity based on user space accessible queues is to provide connectivity based on one or more of: Infrastructure Programmer's Development Kit (IPDK), NVIDIA® DOCA™, or AF_XDP.

Example 17 includes one or more examples, wherein the network interface device is to perform cryptography operations on data based on a reference to a key from the server and the network interface device is to access the key based on the reference and encrypt the data based on the key.

Example 18 includes one or more examples, wherein the encrypt the data comprises perform Transport Layer Security (TLS) encryption of at least one record.

Example 19 includes one or more examples, wherein the transmit encrypted data in one or more packets is to transmit packets to the target Hypertext Transfer Protocol (HTTP) Uniform Resource Locator (URL).

Example 20 includes one or more examples, wherein the network interface device comprises one or more of: a network interface controller (NIC), a remote direct memory access (RDMA)-enabled NIC, SmartNIC, router, switch, forwarding element, infrastructure processing unit (IPU), data processing unit (DPU), or network-attached appliance.

The invention claimed is:

1. An apparatus comprising:
a network interface device comprising:
a host interface;
a direct memory access (DMA) circuitry;
a network interface;
circuitry to perform offloaded operations from a host system of encryption of data,
circuitry to generate one or more packets from the encrypted data,
circuitry to cause transmission of the one or more packets with the encrypted data,
circuitry to perform offloaded operations from the host system to manage reliability of transport of the transmitted one or more packets with the encrypted data, wherein the circuitry to manage reliability of transport of the transmitted one or more packets is to manage packet receipt and packet retransmission of packets identified as not received, and
circuitry to share protocol state information between a host system and the network interface device using user space accessible queues, wherein the user space accessible queues are consistent with Address Family of the eXpress Data Path (AF_XDP) and wherein an application is to access the AF_XDP queues to cause transmission of data in a packet of the transmitted one or more packets or access data of a received packet.

2. The apparatus of claim 1, wherein the network interface device comprises circuitry to receive protocol state information from a host system and to share protocol state information with the host system.

3. The apparatus of claim 1, wherein the protocol state information comprises information related to two or more of: state for packetization, reliable transport, congestion management, packet encryption, packet decryption, and security association.

4. The apparatus of claim 1, wherein the circuitry to share protocol state information between a host system and the network interface device using connectivity based on user space accessible queues is to provide connectivity based on one or more of: Infrastructure Programmer's Development Kit (IPDK) or NVIDIA DOCA.

5. The apparatus of claim 1, wherein the circuitry to perform encryption of data is to receive a reference to a key from the host system and the circuitry to perform encryption of data is to access the key based on the reference and encrypt the data based on the key.

6. The apparatus of claim 1, wherein the encryption of data comprises Transport Layer Security (TLS) encryption of at least one record.

7. The apparatus of claim 1, wherein the circuitry to cause transmission of the one or more packets with the encrypted data is to look-up a target Hypertext Transfer Protocol (HTTP) Uniform Resource Locator (URL) to which to send the one or more packets and stream encrypted data the target HTTP URL.

8. The apparatus of claim 1, wherein the network interface device comprises one or more of: a network interface controller (NIC), a remote direct memory access (RDMA)-enabled NIC, SmartNIC, router, switch, forwarding element, infrastructure processing unit (IPU), data processing unit (DPU), or network-attached appliance.

9. The apparatus of claim 1, comprising:
the host system coupled to the network interface device, wherein the host system is to configure the network interface device to perform offloaded operations from the host system of: encryption of data, generate one or more packets from the encrypted data, cause transmission of the one or more packets with the encrypted data, manage reliability of transport of the transmitted one or more packets with the encrypted data, and share protocol state information between the host system and the network interface device based on user space accessible queues.

10. The apparatus of claim 1, wherein the host system is to initiate and manage a Hypertext Transfer Protocol (HTTP) connection with a target device.

11. The apparatus of claim 9, comprising:
a datacenter comprising a second server to receive the encrypted data in the one or more packets from the network interface device.

12. At least one non-transitory computer-readable medium comprising instructions stored thereon, that if executed by one or more processors, cause the one or more processors to:
configure a network interface device to perform operations offloaded by a server to the network interface device, wherein the offloaded operations comprise:
perform cryptography operations on data,
transmit encrypted data in one or more packets,
look-up of a target device to which to send the one or more packets and stream encrypted data to the target device, and
manage reliability of transport of the transmitted one or more packets to manage packet receipt and packet retransmission of packets identified as not received, wherein the network interface device is to share protocol state information with the server using user space accessible queues, wherein the user space accessible queues are consistent with Address Family of the eXpress Data Path (AF_XDP), wherein the protocol state information comprises information related to four or more of: reliable transport, congestion management, packet encryption, packet decryption, and security association, and wherein an application is to access the AF_XDP queues to cause transmission of data in a packet of the one or more packets or access data of a received packet.

13. The computer-readable medium of claim 12, wherein the network interface device is to share protocol state information with the server using connectivity based on user space accessible queues is to provide connectivity based on one or more of: Infrastructure Programmer's Development Kit (IPDK) or NVIDIA DOCA.

14. The computer-readable medium of claim 12, wherein the network interface device is to perform cryptography operations on data based on a reference to a key from the server and the network interface device is to access the key based on the reference and encrypt the data based on the key.

15. The computer-readable medium of claim 14, wherein the encrypt the data comprises perform Transport Layer Security (TLS) encryption of at least one record.

16. The computer-readable medium of claim 12, wherein the transmit encrypted data in one or more packets is to transmit packets to a target Hypertext Transfer Protocol (HTTP) Uniform Resource Locator (URL) associated with the target device.

17. The computer-readable medium of claim 12, wherein the network interface device comprises one or more of: a network interface controller (NIC), a remote direct memory access (RDMA)-enabled NIC, SmartNIC, router, switch, forwarding element, infrastructure processing unit (IPU), data processing unit (DPU), or network-attached appliance.

18. The apparatus of claim 1, wherein the host system is to receive events associated with packet arrival via the user space accessible queues and the host system is to provide a descriptor to identify a packet payload to transmit via the user space accessible queues.

* * * * *